United States Patent [19]
Terada et al.

[11] Patent Number: 6,167,046
[45] Date of Patent: Dec. 26, 2000

[54] COMMUNICATION METHOD, COMMUNICATION SYSTEM AND COMPUTER READABLE RECORDING MEDIUM RECORDING COMMUNICATION PROGRAM

[75] Inventors: Satoshi Terada, Nara; Toru Ueda, Souraku-gun; Hirohisa Wakai, Habikino; Takashi Nishimura, Tenri, all of Japan

[73] Assignee: Sharp Kabushiki Kaisha, Osaka, Japan

[21] Appl. No.: 09/004,861

[22] Filed: Jan. 9, 1998

[30] Foreign Application Priority Data

Jan. 10, 1997 [JP] Japan .................................... 9-002719
Dec. 2, 1997 [JP] Japan .................................... 9-331654

[51] Int. Cl.[7] ............................................. H04L 12/28
[52] U.S. Cl. ...................................... 370/389; 340/825.07
[58] Field of Search ............................. 340/825, 825.07; 364/140, 141; 370/389; 709/203, 221, 220

[56] References Cited

U.S. PATENT DOCUMENTS

| | | |
|---|---|---|
| 4,969,147 | 11/1990 | Markkula, Jr. et al. . |
| 5,341,499 | 8/1994 | Doragh ..................................... 709/321 |
| 5,467,263 | 11/1995 | Gilbert ................................. 340/825.07 |
| 5,570,085 | 10/1996 | Bertsch . |
| 5,870,554 | 2/1999 | Grossman et al. ....................... 709/221 |
| 5,950,010 | 4/1999 | Hesse et al. ............................. 709/220 |
| 5,999,740 | 12/1999 | Rowley .................................... 709/221 |

FOREIGN PATENT DOCUMENTS

| | | |
|---|---|---|
| 0 610 630 | 8/1994 | European Pat. Off. . |
| 8-19060 | 1/1996 | Japan . |

*Primary Examiner*—Douglas W. Olms
*Assistant Examiner*—Ken Vanderpuye
*Attorney, Agent, or Firm*—Nixon & Vanderhye P.C.

[57] ABSTRACT

In a communication network in which a plurality of equipments each having a function implementing unit having a plurality of functions and a communication control unit having communication function communicating with each other, the communication control unit includes a recording medium and stores on the recording medium in advance a plurality of pieces of function information related to at least one function held by the corresponding function implementing unit, and inquires function information of each of other equipments at the time of communication. Therefore, management of various equipments and function information of various equipments in correspondence with each other becomes unnecessary, load in processing including communication is relieved and functions of respective equipments can be controlled efficiently.

14 Claims, 36 Drawing Sheets

| B1 : FUNCTION | B2 : DETAILED INFORMATION |
|---|---|
| VIDEO OUTPUT FUNCTION | LCD··· |
| AUDIO OUTPUT FUNCTION | MONORAL··· |
| VIDEO INPUT FUNCTION | CCD CAMERA··· |
| AUDIO INPUT FUNCTION | MONORAL MICROPHONE··· |

| C1 : GENRE | C2 : TITLE |
|---|---|
| MOVIE | ··· |
| MUSIC | ··· |
| COOKING | ··· |

| C3 : TIME | C4 : OPERATION HISTORY |
|---|---|
| 7 : 00~8 : 20 | RECORDING OF 10CH |
| ··· | ··· |
| ··· | ··· |

| C5 : FOOD | C6 : DATE OF PUT IN |
|---|---|
| CABBAGE | 1996/9/28 |
| EGG | 1996/10/1 |
| MILK | 1996/9/30 |

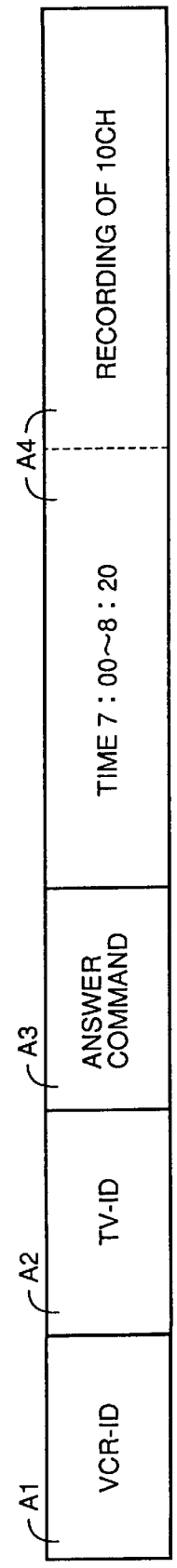

COMMUNICATION METHOD, COMMUNICATION SYSTEM AND COMPUTER READABLE RECORDING MEDIUM RECORDING COMMUNICATION PROGRAM

BACKGROUND OF THE INVENTION

1. Field of the Invention

The present invention relates to a communication method, a communication system and a computer readable recording medium recording a communication program for a communication network in which a plurality of equipments allowing communication with each other are connected. More specifically, the present invention relates to a communication method, a communication system and a computer readable recording medium recording a communication program in which various information including functions of a plurality of equipments connected to the communication network can be shared by respective equipments.

2. Description of the Background Art

Japanese Patent Laying-Open No. 8-19060 discloses an AV (Audio Visual) equipment control system to which a plurality of AV equipments are connected for communication and which allows operation of these equipments collectively. In the AV equipment control system, when a new AV equipment is connected to the system, the new AV equipment transmits a control object to a control apparatus controlling each of the AV equipments. At this time, the new AV equipment must first designate an address of the control apparatus and then transmit the control object. Similarly, when the control apparatus controls each of the AV equipments connected to the system, an address or ID (Identification) for designating each AV equipment must be known in advance.

When a plurality of AV equipments are to be controlled, an address designation of "ALL" is allowed, which address designation is for controlling all the AV equipments connected.

In the AV equipment control system described in the aforementioned laid-open paten application, it is necessary for the control apparatus to know in advance correspondence between functions of respective AV equipments and the addresses or IDs of the AV equipments, by incorporating a table of correspondence. When the number of AV equipments is small, it is easy for the control apparatus to know or comprehend the addresses, IDs and functions utilizing a table. However, when the number of AV equipments is very large or when each AV equipment may serve as a control apparatus as well as a controlled apparatus, it is extremely difficult to comprehend all the addresses, IDs and functions of those AV equipments which may also function as control apparatus, by utilizing a table. Further, when a control apparatus is newly added or omitted, the address, ID or function of the added or omitted control apparatus must be added to or deleted from the table in each AV equipment, which results in troublesome table management.

In AV equipment designation using an ID or an address, individual AV equipment may be designated, or all AV equipments may be designated. Therefore, when television image display by an AV equipment capable of outputting the television image is desired, a packet is individually transmitted to every AV equipment inquiring whether it has television image output function, and thereafter, a control packet for television image output is transmitted again individually to those AV equipments which have the television image output function. Therefore, the number of packets in transmission paths is considerably large, and therefore efficiency in communication and control is not very high.

Recently, the number of electrical appliances or equipments for home use has been increasing. Therefore, a system for controlling all the electrical appliances for home use through a communication network has been desired. In order to control various electrical appliances or equipments, a method of managing respective addresses of the equipments is necessary. However, preparation of a management table is troublesome. Further, in a home network, it is not practical to provide a centralized managing equipment. However, when management tables are managed in decentralized manner by respective equipments, management would be very troublesome.

SUMMARY OF THE INVENTION

Therefore, an object of the present invention is to provide a communication method, a communication system and a computer readable recording medium recording a communication program which allows effective control of function units of various equipments through communication, in a communication network including a plurality of equipments communicating with each other by transmitting/receiving and processing packets, with each of the plurality of equipments having a communication unit implementing communication function-and a function-<it implementing at least one function different from communication function.

The above-described object of the present invention can be attained by the communication method in accordance with the present invention in a communication network including a plurality of equipments communicating with each other by transmitting, receiving and processing a packet, each of the plurality of equipments having a communication unit for implementing communication function and a function unit for implementing at least one function other than the communication function, wherein the communication unit has a function information storage storing a plurality of pieces of function information related to the aforementioned at least one function of the corresponding function unit, and the communication method inquires the plurality of pieces of function information stored in the function information storage of respective ones of the plurality of equipments using a packet, in the communication unit.

Therefore, it is possible for the communication unit of each equipment to inquire and confirm a plurality of pieces of function information related to a function of a function unit of another equipment.

Therefore, in this network, the process for managing correspondence between respective equipments and a plurality of pieces of information of functions of the equipments is unnecessary. Therefore, the load of processing including communication in the system can be relieved, and therefore, functions of various equipments can be controlled efficiently.

In the communication method described above, a packet stores a transmission source information for uniquely designating a transmission source equipment of the packets a transmission destination information for uniquely designating a transmission destination equipment for the packet, instruction information for implementing the aforementioned at least one function of the function unit or implementing the communication function, and related information related to the instruction information. The communication method includes the step of receiving an external request, and at least one of the step of transmitting an inquiry packet and the step of transmitting an answer packet, the at least one step being carried out in the communication unit.

In the step of transmitting an inquiry packet, a packet is transmitted to each of the plurality of equipments in response to the received external request, the packet including an inquiry as to whether a prescribed function information is included among a plurality of pieces of function information, as instruction information and related information.

In the step of transmitting an answer packet, in response to reception of the packet transmitted in the inquiry packet transmission step, a packet storing an answer as to whether the prescribed function information inquired is contained in the function information storage as instruction information and related information, is transmitted.

Therefore, it is possible for each equipment by transmitting a packet in the inquiry packet transmission step and receiving a packet transmitted in the answer packet transmission step, to confirm correspondence between the information designating the equipment obtained as transmission source information, of each equipment and the function information of that equipment.

Therefore, an equipment can be specified by transmitting an inquiry of function immediately before control. Accordingly, it becomes unnecessary to provide in advance a table for managing correspondence between information uniquely designating respective equipments and function information of the equipments. Further, updating of the table is unnecessary even when an equipment is added to or omitted from the network. Therefore, addition or omission of an equipment to and from the network is simplified. Further, functions of function units of the plurality of equipments can be shared by means of packets, without the necessity of providing a special apparatus.

The communication method described above may further include the step of transmitting a packet storing any of a plurality of pieces of function information as transmission destination information, the step of receiving the packet transmitted in the aforementioned transmission step, and determining whether the transmission destination information of the received packet matches any of a plurality of pieces of function information in the function information storage, and the step of executing processing in accordance with the instruction information and the related information of the received packet, in response to a result of determination of matching of the determination step, carried out in the communication unit.

Therefore, it is possible for each equipment to transmit a packet storing function information held by each equipment as transmission destination information.

Therefore, when an equipment transmits a packet to all other equipments having a certain function information, it is possible to reduce the number of packets transmitted. Therefore, communication medium can be utilized effectively, and efficiency in controlling each equipment utilizing communication is improved.

In the communication method described above, the communication unit further includes an identification information storage storing identification information for facilitating identification of function information corresponding to respective ones of the plurality of pieces of function information and a first output section, and the communication method may further include the step of transmitting an identification information answer packet for transmitting, in response to reception of a packet transmitted in the inquiry packet transmission step, a packet storing identification information stored in the identification information storage corresponding to the prescribed function information inquired, as related information, in the answer packet transmission step, and the method may further include a first output step for receiving the packet transmitted in the step of transmitting the identification information answer packet for outputting and reporting the content of the received packet to the first output section, carried out in the communication unit.

Therefore, in response to an inquiry issued in the inquiry packet transmission step, when there is an answer from each equipment in the answer packet transmission step, the identification information of the function information of the responded each equipment is reported through the first output section in the first output step.

Therefore, it is possible for the user to confirm the reported content from the first output section and to readily recognize the function information of the desired equipment.

In the method of communication described above, the communication unit further includes a first input section for receiving as an input, data from the outside, and the communication method may further include a packet generation and transmission step for generating and transmitting a packet using the data input through the first input section in accordance with the content reported from the first output section, which step is performed in the communication unit. Therefore, when a user inputs data through the first input section based on the function information held by a desired equipment recognized through the first output section, a packet in accordance with the content of the input data is generated, and transmitted to the desired equipment in the packet generation transmission step.

Therefore, it is possible for the user to readily and surely perform control related to the desired function information of other desired equipments by each equipment in the network.

In the communication method described above, the plurality of pieces of function information may include function specifying information for specifying each of the aforementioned at least one function implemented by the function unit, or control object information indicating an object to be controlled by implementation of the function.

Therefore, each equipment is capable of inquiring the function specifying information specifying the function held by each of the remaining equipments or the control object information indicating the object to be controlled by the implementation of the function, as needed.

Therefore, in the network, the process for managing respective equipment and information specifying the functions of the equipments or control object information in correspondence with each other becomes unnecessary. Therefore, the load of processing including communication in the network is relieved, and efficiency in control of the functions of respective equipments using communication is improved.

In the communication method described above, the communication unit further includes an ability information storage corresponding to respective ones of pieces of the function specifying information, for storing ability information indicating relative ability level when a plurality of equipments carry out or implement a function corresponding to one same function specifying information, and the communication method may further include a first step of selecting an equipment and a first transmission step, and the answer packet transmission step described above may further include a step of transmitting an ability information answer packet, which steps are performed in the communication unit.

In the step of transmitting ability information answer packet, in response to reception of the packet transmitted in the inquiry packet transmission step, a packet storing as related information, ability information stored in the ability information storage which information corresponding to the inquired prescribed function specifying information is generated and transmitted. In the first step of selecting an equipment, the packet transmitted in the step of transmitting ability information answer packet is received, and a specific equipment among a plurality of equipments is selected, based on the ability information of the received packet. In the first transmission step, a packet storing information designating that equipment which is selected in the first step of selecting an equipment as transmission destination information is transmitted.

Therefore, it is possible for each equipment to select an equipment and to transmit a packet to the selected equipment, based on the relative ability level when various equipments having the same function implement the said function respectively.

Therefore, the user can select an equipment which has a desired ability level for the desired function and to realize the desired function by transmitting a packet to the selected equipment. Therefore, control in accordance with the user's request is readily possible for each equipment.

In the communication method described above, the communication unit may further include a priority storage corresponding to respective ones of pieces of function specifying information for storing priority information indicating relative priority when a plurality of equipments carry out a function corresponding to one same function specifying information, and the communication method may further include a second step of selecting an equipment and a second transmission step, and the answer packet transmission step may further include a step of transmitting a priority answer packet.

In the priority answer packet transmitting step, in response to reception of the packet transmitted in the inquiry packet transmission step, a packet storing as related information the priority information in the priority storage corresponding to the inquired prescribed function specifying information is generated and transmitted.

In the second step of selecting an equipment, the packet transmitted in the priority answer packet transmission step is received, and a specific equipment is selected among the plurality of equipments based on the priority information in the received packet. In the second transmission step, a packet storing information designating that equipment which is selected in the second step of selecting an equipment as transmission destination information is generated and transmitted.

Therefore, it is possible to select an equipment and transmit a packet to the selected equipment, based on the priority among respective equipments having the same function, in implementing the function.

Therefore, it is possible for the user to select an equipment having a desired priority for the desired function, and to realize the desired function by transmitting a packet to the selected equipment. Therefore, control which is more flexible to the request of the user is possible.

In the communication method described above, the communication unit may further include a second output section, and the communication method may further include a state determination step, a busy packet transmission step and a second output step, which steps are performed in the communication unit.

In the state determination step, a packet is received and whether the function unit is busy or not is determined, where the busy state refers to a state where a prescribed function is being carried out in the function unit and a function in accordance with the instruction information of the received packet cannot be performed. In the busy packet transmission step, in response to determination in the state determination step that it is a busy state, a packet storing as an answer, busy information indicating that the equipment is in the busy state as instruction information and related information is generated and transmitted as a busy packet. In the second output step, the busy packet transmitted in the busy packet transmission step is received, and the content of the received busy packet is output and reported to the second output section.

Therefore, it is possible to report to the user that the function unit of the desired equipment is in the busy state.

Therefore, the user immediately knows, when a packet is transmitted to the desired equipment, why the function in accordance with the instruction information in the packet is not performed. Further, wasteful communication process such as repeated transmission of a packet when the desired equipment is busy but the busy state is not known can be eliminated and load related to communication is relieved. Thus efficiency in control of equipments through communication is improved.

In the communication method described above, the communication unit further includes a second input section for receiving as an input, data from the outside, and the communication method may further include an interruption packet transmission step for generating and transmitting an interruption packet using the data input through the second input section in accordance with the content reported from the second output section, and a control step responsive to the reception of the interruption packet for having the function unit execute a process in accordance with the content of the received interruption packet, which steps are performed in the communication unit.

The interruption packet stores as transmission destination information, information designating an equipment of a busy packet transmission source, and stores as instruction information, a command for interrupting implementation of a prescribed function causing the busy state and for starting implementation of the desired function.

Therefore, when a desired equipment is in the busy state, it is possible to interrupt implementation of a prescribed function which is causing the busy state and to start implementation of the desired function, by using the interruption packet.

Therefore, it is possible for the user to realize the desired function in place of the function which is being carried out by the desired equipment, simply by inputting data through the second input section as desired. Therefore, control to meet the request of the user is possible.

The communication method described above may further include a busy cancellation determination step for determining whether the busy state is canceled or not in the function unit, and a step of transmitting a busy cancellation packet responsive to determination in the busy cancellation determination step that the busy state is canceled, for generating and transmitting a packet storing as the transmission destination information, information designating an equipment of the busy packet transmission source, and storing as the instruction information, a command indicating that the busy state has been canceled, which steps are performed in the communication unit.

Therefore, it is possible for each equipment to know that the busy state of another equipment is canceled, without the necessity of repeatedly transmitting an inquiry packet related to the busy state of the equipment.

Accordingly, wasteful transmission and reception of the packet can be avoided, load in communication in each equipment is relieved and efficiency in control is improved.

The above described objects of the present invention can be attained by a communication system in a communication network including a plurality of equipments communicating with each other by transmitting, receiving and processing packets, with each of the plurality of equipments having a communication unit implementing communication function and a function unit implementing at least one function different from the communication function, in which the communication unit has a function information storage for storing a plurality of pieces of function information related to the aforementioned at least one function of the corresponding function unit, and the communication unit is adapted to inquire the plurality of pieces of function information stored in the function information storage of respective ones of the plurality of equipments, using a packet.

Therefore, it is possible for the communication unit of each equipment to inquire and confirm the function information held by the function unit of other equipment as needed.

Therefore, in this network, it is unnecessary to manage correspondence between respective equipments and the function information of the equipments, and therefore load in processing including communication in the network is relieved, and efficiency in control of respective equipments can be improved.

In the above described communication system, a packet stores transmission source information for uniquely designating an equipment of transmission source of the packet, transmission destination information for uniquely designating an equipment as the transmission destination of the packet, instruction information for implementing any of the aforementioned at least one function of the function unit or the communication function and related information related to the instruction information. The communication system may include an inquiry packet transmitting section for transmitting a packet storing an inquiry as to whether a prescribed function information is contained in the plurality of pieces of function information as the instruction information and related information to each of the plurality of equipments, and an answer packet transmitting section responsive to reception of the packet transmitted by the inquiry packet transmitting section for transmitting a packet storing as the instruction information and a related information an answer indicating whether the prescribed function information inquired is contained in the function information storage.

Therefore, it is possible for each equipment by transmitting a packet from the inquiry packet transmitting section and receiving a packet transmitted from the answer packet transmitting section, to confirm correspondence between the information designating the equipment obtained as the transmission source information of another equipment and the function information belonging to the equipment.

Therefore, a table managing information uniquely designating respective equipments and function information of respective equipments in correspondence with each other is unnecessary. Further, updating of the table is not necessary even when an equipment is added to or deleted from the network, which facilitates addition/omission of an equipment to and from the network. Further, the plurality of equipments can share the plurality of functions of the function units of each other through packets, without the necessity of providing a special apparatus.

The communication system described above further includes a transmitting section, a determination section and a process executing section in the communication unit.

The transmitting section transmits a packet storing any of the plurality of pieces of function information as the transmission destination information.

The determination section receives the packet transmitted from the transmission section, and determines whether the transmission destination information in the received packet matches any of the plurality of pieces of function information stored in the function information storage.

The process executing section executes a process in accordance with the instruction information and related information in the received packet, in response to the result of determination of matching, by the determination section.

Therefore, it is possible for each equipment to transmit and receive a packet storing function information of respective equipment as transmission destination information.

Therefore, when an equipment transmits a packet to all other equipments having a certain function information, the number of packets transmitted is reduced. Therefore, the communication medium can be utilized effectively, and efficiency in controlling respective equipments through communication is improved.

The above described object of the present invention can be attained by a computer readable recording medium recording a communication program for a computer to execute the communication method of the present invention in which the communication method is for a communication network including a plurality of equipments communicating with each other by transmitting, receiving and processing a packet, with each of the plurality of equipments having a communication unit for implementing communication function and a function unit for implementing at least one function other than the communication function, the communication unit having a function information storage for storing a plurality of pieces of function information related to the aforementioned at least one function of the corresponding function unit, and the communication method is adapted to inquire a plurality of pieces of function information stored in the function information storage, to each of the plurality of equipments using a packet.

Therefore, it is possible for the communication unit of each equipment to inquire of the information related to the function of the function unit of other equipments, as needed.

Therefore, in the network, the process for managing correspondence between respective equipments and information related to the functions of the equipments is unnecessary. Therefore, load in processing including communication in the network is relieved, and efficiency in control through packets of respective equipments can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8A and 8B show further examples of an answer packet shown in FIG. 4E.

DESCRIPTION OF THE PREFERRED EMBODIMENTS

First to eighth embodiments of the present invention will be described in the following. In the first to eighth embodiments of the present invention, when a plurality of electrical appliances for home use are connected to each other to allow communication through a communication network, each of the electrical appliances are controlled, designated as an object of control, using information of a unique function of respective ones of the appliances.

The first to eighth embodiments are described in accordance with the content of information related to the functions used for designating respective ones of the appliances as an object of control. Though the object of control is described as one of the electrical appliances for home use in the first to eighth embodiments, the object is not limited thereto.

In the first to eighth embodiments, each of the plurality of electrical appliances connected to a communication network is designated as an equipment of the object of communication and the object of control, using an address uniquely specifying itself allotted in advance, information and CONTENTS for specifying the function which the equipment has uniquely.

Here, the term CONTENTS refers to the information among various types of information held by each equipment, that indicates an object to be controlled by implementation of the function of each equipment.

Figure 1:
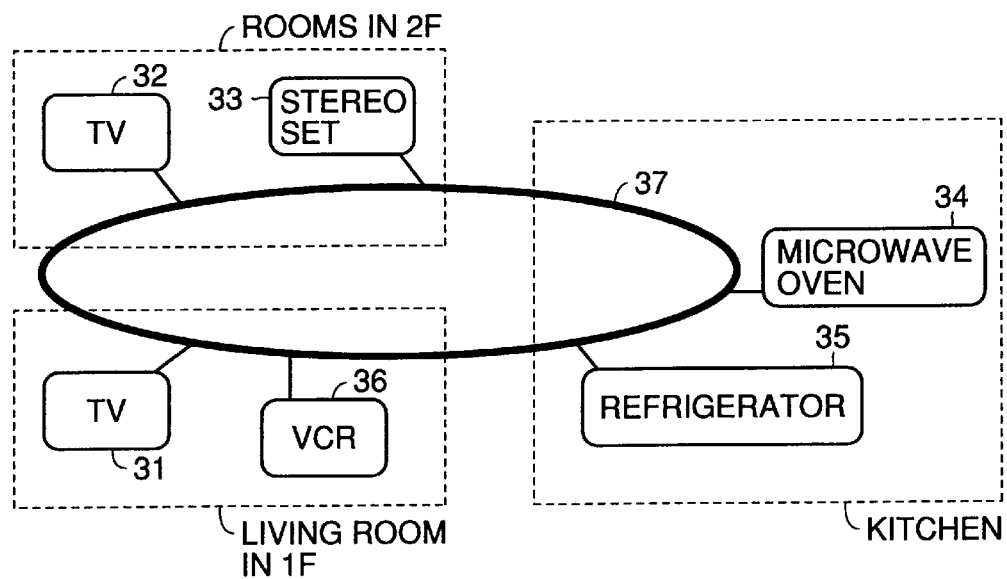
FIG. 1 shows an overall configuration of a communication system connecting electrical appliances or equipments for home use applied to the first to eighth embodiments of the present invention.

FIG. 1 shows an overall configuration of a communication system connecting the electrical appliances in a home applied to the first to eighth embodiments of the present invention.

The communication system of FIG. 1 includes a transmission path 37 capable of transmitting data packets, provided in an ordinary home. The transmission path 37 is connected to a television (TV) 31 and a VCR (Video Cassette Recorder) 37 in the living room on the first floor, a TV 32 and a stereo set 33 in rooms on the second floor, and a microwave oven 34 and a refrigerator 35 in the kitchen, as electrical appliances or equipments having communication function.

Figure 2:
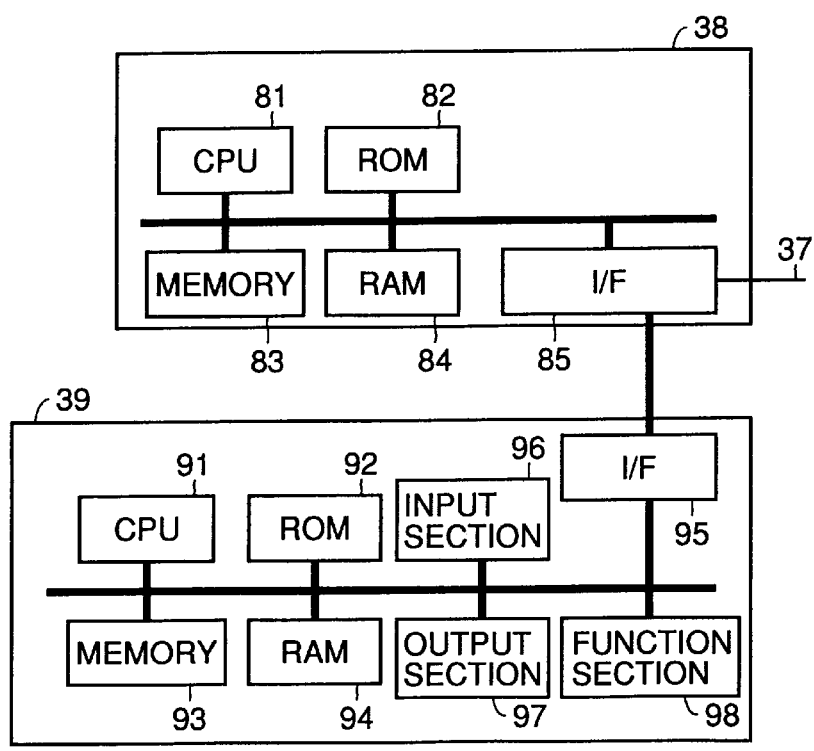
FIG. 2 is a hardware block diagram of the electrical appliances for home use shown in FIG. 1.

FIG. 2 is a hardware block diagram of each of the electrical appliances or equipments of FIG. 1. Referring to FIG. 2, each of the electrical appliances or equipments of FIG. 1 has a communication control unit 38 for communication with other electrical appliances or equipments through communication path 37 to control other equipments and to be controlled by other equipments, and a function implementing unit 39 for executing the essential function such as image display function for a TV and cooling function for a refrigerator, in association with the communication operation performed by the communication control unit 38.

Communication control unit 38 includes a CPU (Central Processing Unit) 81, an ROM (Read Only Memory) 82, a memory 83, an RAM (Random Access Memory) 84 and an I/F (Interface) 85 for controlling communication between transmission path 37 and communication control unit 38 and between function implementing unit 39 and communication control unit 38. Function implementing unit 39 includes a CPU 91, an ROM 92, a memory 93, an RAM 94, an I/F 95 for controlling communication between communication control unit 38 and function control unit 39, an input section 96 externally operated by an operator for receiving as inputs Ivarious data, an output section 97 for outputting various data, and a function section 98 for processing the essential function mentioned above.

(First Embodiment)

Figure 3:
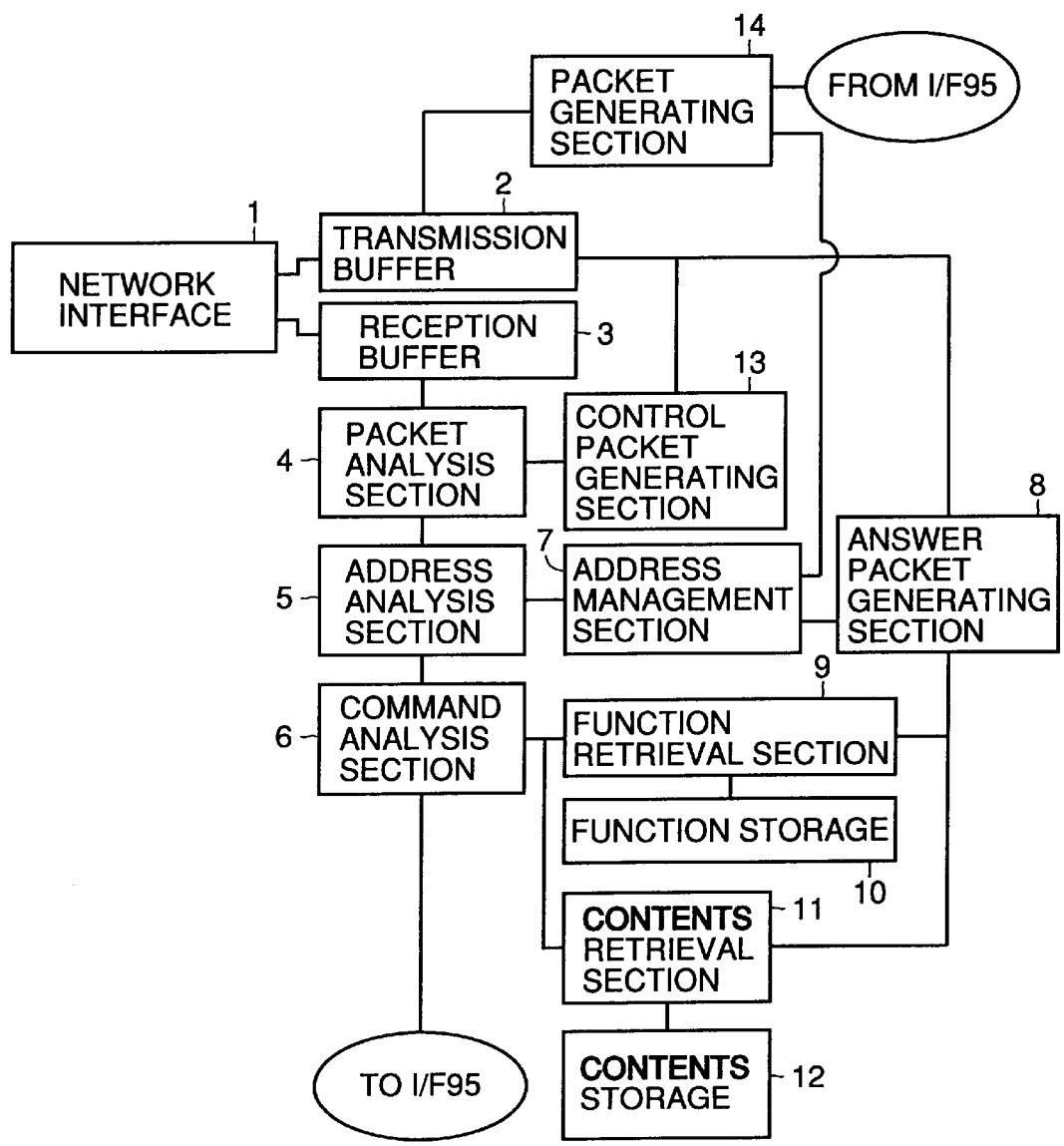
FIG. 3 shows a system configuration of a communication control unit shown in FIG. 2, in accordance with the first embodiment of the present invention.

FIG. 3 shows a system configuration of communication control unit 38 shown in FIG. 2 in accordance with the first embodiment of the present invention.

Figure 4A:
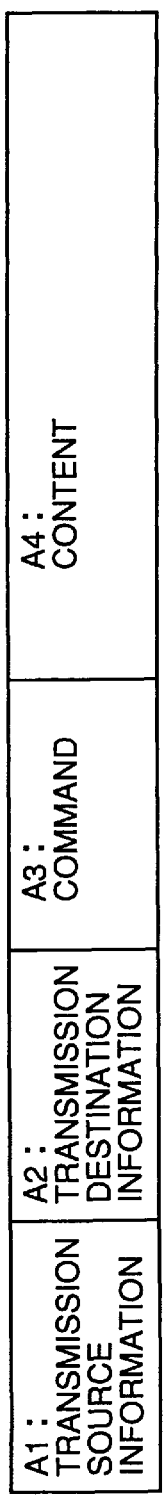
FIGS. 4A to 4E show field configuration of various packets in accordance with the first embodiment of the present invention.
Figure 4B:
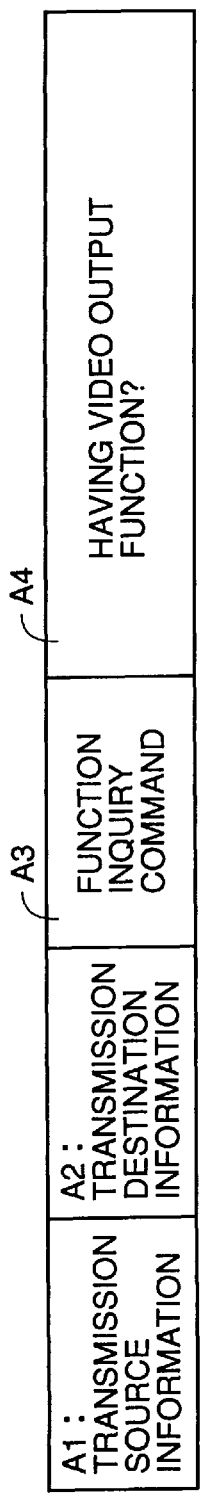
Figure 4C:
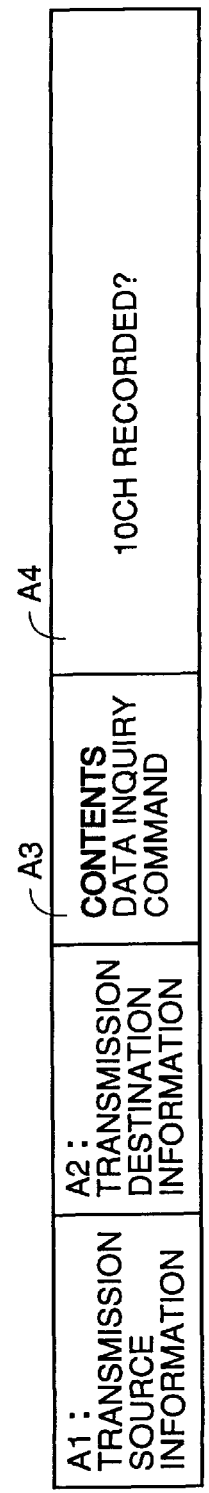
Figure 4D:
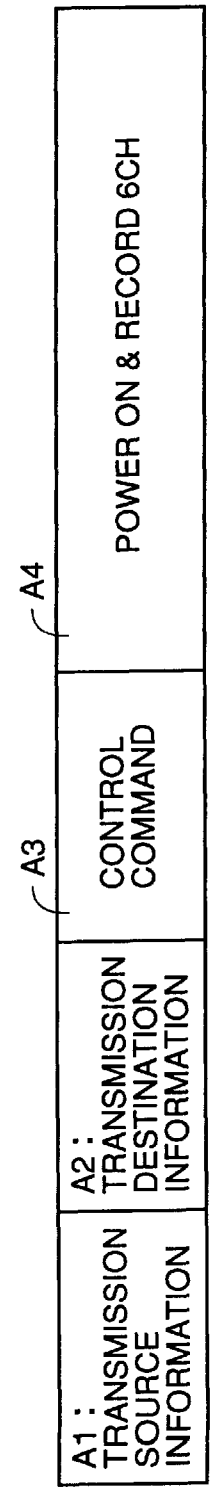
Figure 4E:
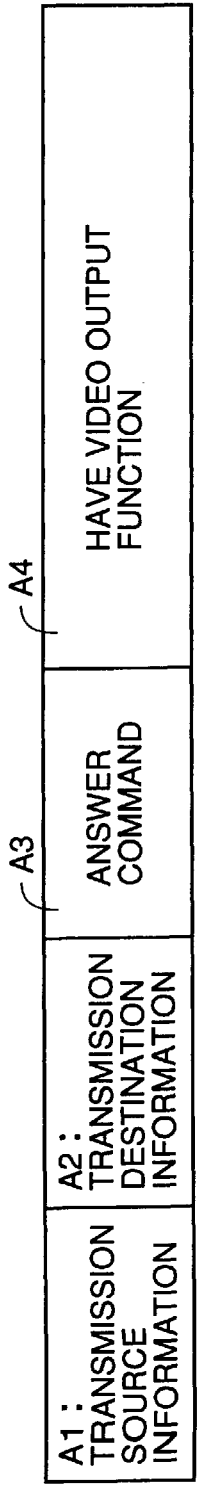

FIGS. 4A to 4E show field configurations of various packets in the first embodiment of the present invention. FIG. 4A shows a basic field configuration of a packet. FIGS. 4B and 4C show inquiry packets, and FIGS. 4D and 4E show answer packets. Referring to FIG. 4A, the packet includes a transmission source information A1 indicating an electrical equipment as a source of transmission of the packet, transmission destination information A2 indicating an electrical equipment as a transmission destination of the packet, a command A3 and a content A4 related to the command A3. Each of the electrical appliances or equipments shown in FIG. 1 has an address for uniquely specifying itself allotted in advance, and in the first embodiment, the address is used for designating the transmission source and destination of the packet.

The packet of FIG. 4B stores a command for inquiring the function of the electrical equipment and specific content of inquiry, as command A3 and content A4. The packet shown in FIG. 4C stores a command inquiring CONTENTS data of the electrical equipment and specific content of the inquiry as command A3 and content A4. The data packet shown in FIG. 4D stores a command controlling function implementing unit 98 of the electrical equipment and specific content of control, as command A3 and content A4. The packet shown in FIG. 4E stores a command indicating that the packet is an answer packet, and specific content of the answer as command A3 and content A4.

Referring to FIG. 3, communication control unit 38 includes a network I/F (hereinafter simply referred to as I/F) 1 for controlling communication between communication control unit 38 and transmission path 37, in relation to I/F 85; a transmission buffer 2 for temporarily storing a packet to be transmitted to other electrical equipment connected to transmission path 37; a reception buffer 3 for temporarily storing a packet received from other electrical equipment connected to transmission path 37; a packet analysis section 4 for analyzing a received packet in reception buffer 3; an address analysis section 5 for comparing transmission destination information of the received packet obtained by the analysis at packet analysis section 4 with self address 71 in address management section 7 which will be described later; a command analysis section 6 for analyzing a command in the received packet obtained by the analysis of the received packet; an address management section 7; an answer packet generating section 8; a function retrieval section 9; a function storage 10; a CONTENTS retrieval section 11; a CONTENTS storage 12; a control packet generating section 13; and a packet generating section 14.

Transmission buffer 2, reception buffer 3, address management section 7, function storage 10 and CONTENTS storage 12 are provided as regions for storing data on ROM 82, RAM 84 and memory 83 of FIG. 2. Other sections shown in FIG. 3 are stored in advance in ROM 82 as programs and executed under the control of CPU 81, or after the contents of ROM 82 are developed in RAM 84, executed under the control of CPU 81.

Figure 5:
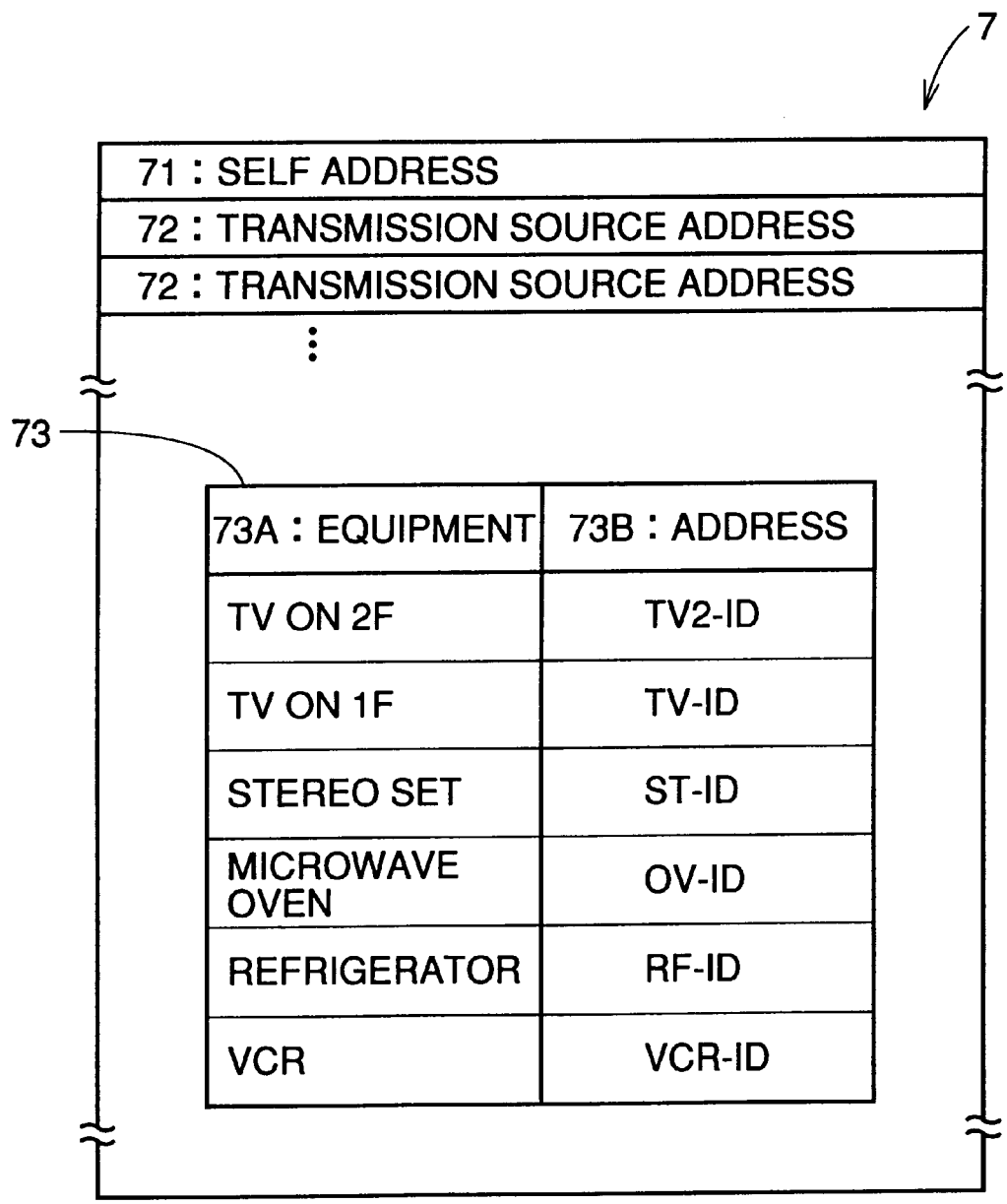
FIG. 5 shows contents of address management section shown in FIG. 3.

FIG. 5 shows contents of address management section 7 shown in FIG. 3. Address management section 7 includes a self address 71 allotted in advance for uniquely specifying the electrical equipment itself, a transmission source address 72 which is transmission source information A1 of the received packet, and an address table 73.

One or more transmission source addresses 72 are stored, and addresses 72 are stored in accordance with the order of reception of packets, respectively. In address table 73, addresses 73B corresponding to respective ones of electrical equipments 73A connected to transmission path 37 of FIG. 1 are stored. Addresses 73B correspond to self addresses 71 of respective electrical equipments.

Figure 6:
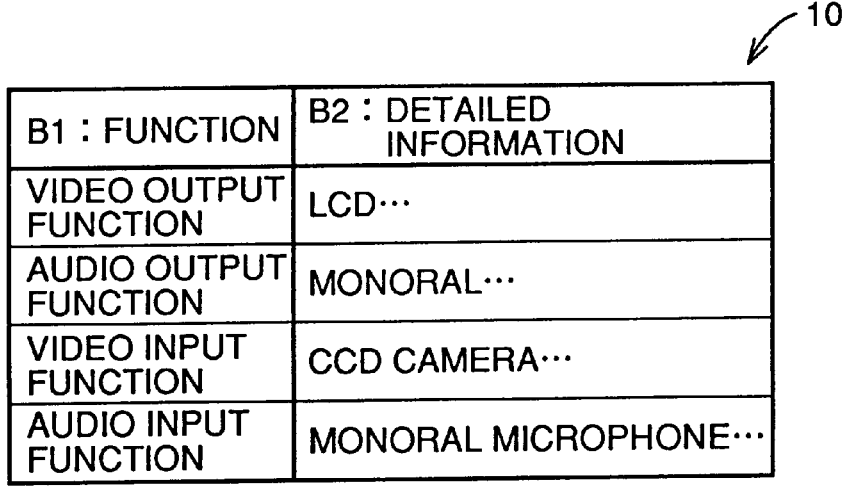
FIG. 6 shows an example of contents of the function storage shown in FIG. 3.
Figure 7A:
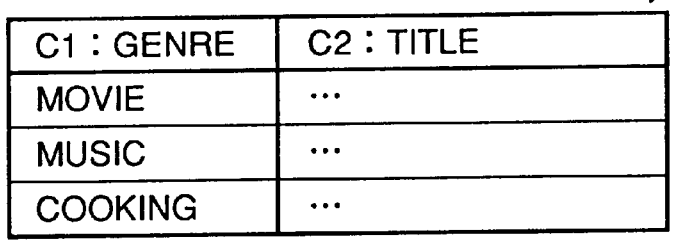
FIGS. 7A to 7C show contents of CONTENTS storage shown in FIG. 3.
Figure 7B:
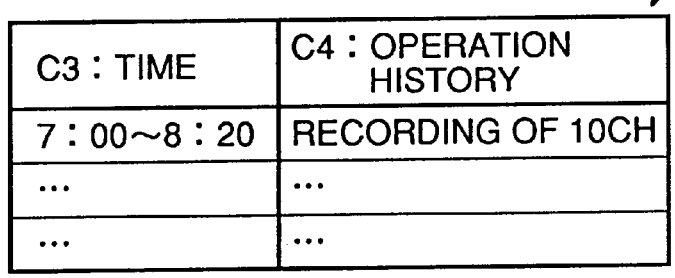
Figure 7C:
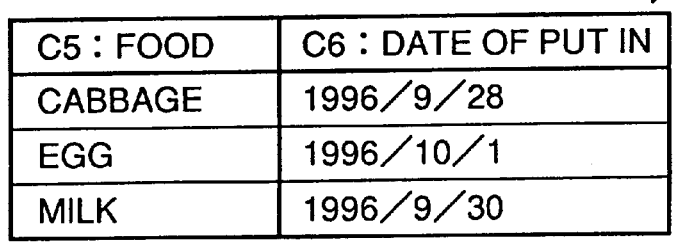

FIG. 6 shows an example of contents in function storage 10 of FIG. 3. FIGS. 7A to 7C show examples of contents of CONTENTS storage 12 shown in FIG. 3. FIG. BA and 8B show further examples of an answer packet shown in FIG. 4E.

In function storage 10, unique function of an electrical equipment, that is, the function performed by the function unit 98 is stored in the form of information, in advance. FIG. 6 shows contents of function storage 10 when the electrical equipment is a videotape recorder with a camera having display function. In this case, in function storage 10, one or more functions B1 and detailed information B2 related to respective functions B1 are stored. For example, when the equipment has liquid crystal display function, information indicating "LCD (Liquid Crystal Display)" is stored as detailed information B2 corresponding to the video output function shown in FIG. 6.

Function retrieval section 9 retrieves function information stored in function storage 10, in accordance with the content of the received packet.

In CONTENTS storage 12, CONTENTS data held by the electrical equipment is stored in advance. When the electrical equipment is a VCR, a genre C1 and a title C2 indicating the recorded content are stored in correspondence to each other in the example shown in FIG. 7A, and time C3 of recording and operation history C4 indicating the channel of the TV designated for recording are stored in correspondence to each other in the example shown in FIG. 7B.

Other than the AV equipments, CONTENTS data of an equipment such as refrigerator 35 is input by user's manual input or by reading a bar code attached to food, for example. FIG. 7C shows an example of CONTENTS storage 12 of refrigerator 35. In the example of FIG. 7C, name of food C5 and the data C6 when the food is input to the refrigerator are stored in correspondence to each other.

CONTENTS retrieval section 11 retrieves CONTENTS data in CONTENTS storage 12 based on the content of t he received packet.

Answer packet generating section 8 generates an answer packet shown in FIG. 4E based on self address 71 stored in address management section 7, transmission source address 72, function information obtained by retrieval by function retrieval section 9 and CONTENTS data obtained by retrieval by CONTENTS retrieval section 11, and stores the packet in transmission buffer 2.

Control packet generating section 13 generates a control packet shown in FIG. 4D for controlling a desired electric equipment, and stores the generated packet in transmission buffer 2.

Packet generating section 14 generates an inquiry packet or a control packet such as shown in FIG. 4B or 4C in accordance with the content of instruction applied from 20 function implementing unit 39 through I/F 95, and stores the generated packet in transmission buffer 2.

Figure 9:
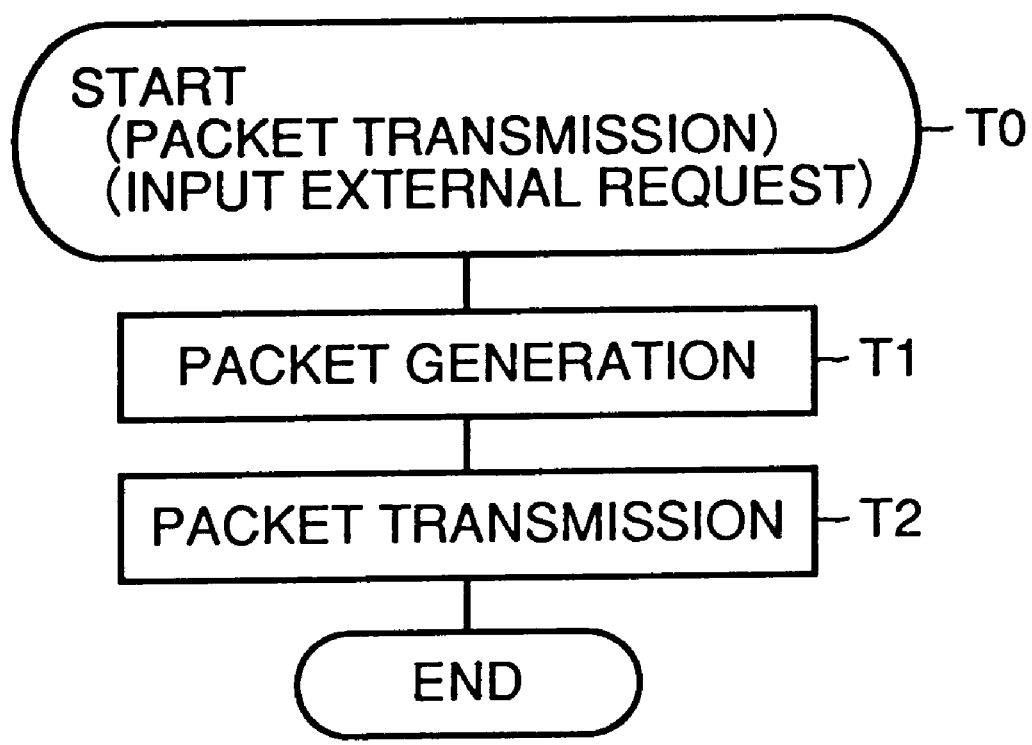
FIG. 9 is a flow chart showing a packet transmission process in each of the electrical appliances in accordance with the first embodiment of the present invention.

FIG. 9 is a flow chart showing a packet transmission process in the electronic appliances for home use in accordance with the first embodiment of the present invention. When a packet is transmitted, first, a user operates input section 96 to input a request and, in response, CPU 91 applies the input request to communication control unit 38 through I/F 95.

When the request is received (TO), packet generating section 14 of communication control unit 38 generates a packet having such a field configuration as shown in FIG. 4A based on the content of request, and stores the generated packet in transmission buffer 2 (TI).

I/F 1 transmits the packet stored in transmission buffer 2 through transmission path 37.

Figure 10:
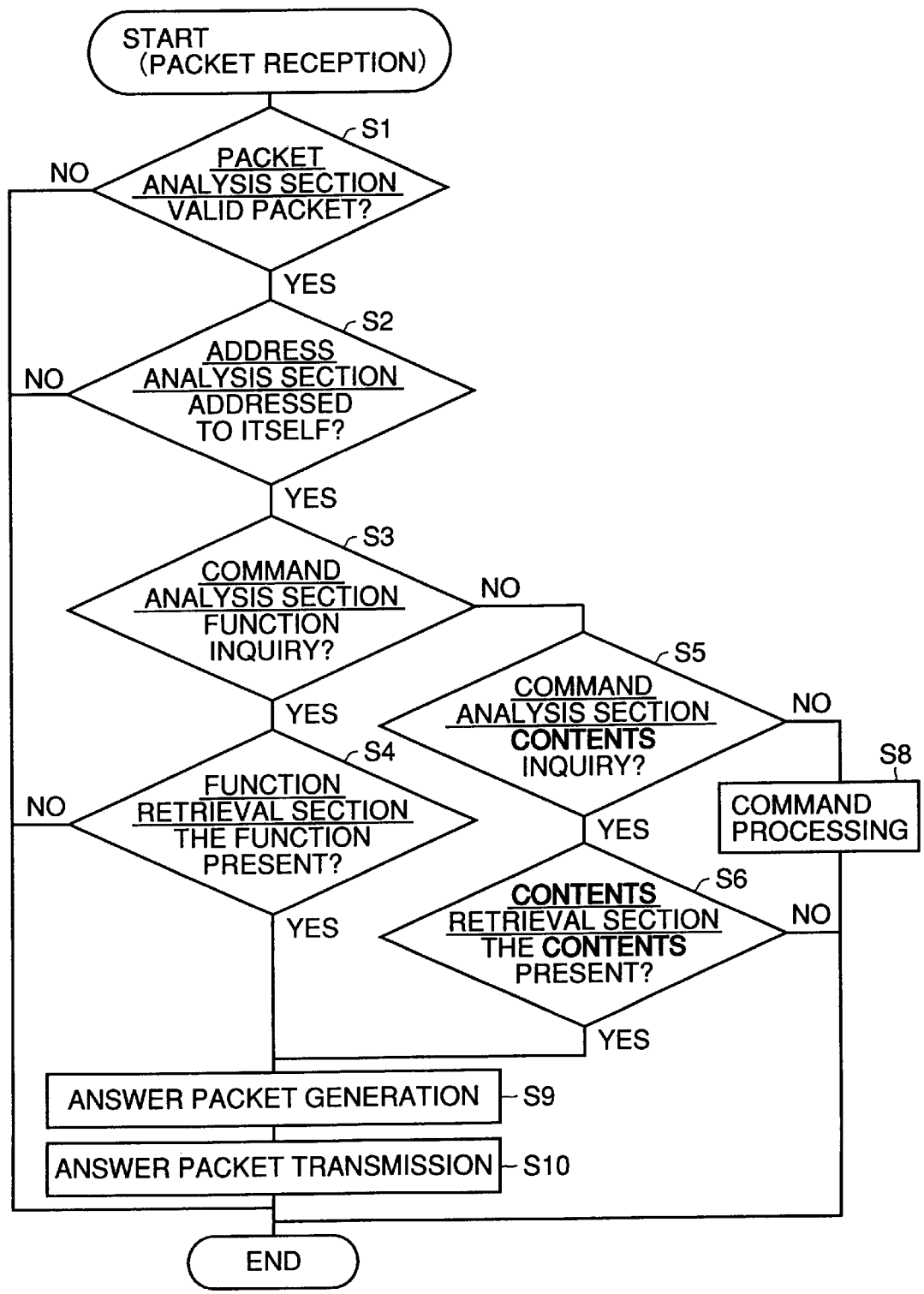
FIG. 10 is a flow chart of packet reception processing for each of the electrical appliances in accordance with the first embodiment of the present invention.

FIG. 10 is a flow chart showing packet reception process at each electrical equipment in accordance with the first embodiment of the present invention.

When the packet having such a field configuration as shown in FIG. 4A is received through I/F 1 at each electrical equipment, the received packet is stored in reception buffer 3.

Thereafter, packet analysis section 4 determines whether or not the packet is a valid packet or not based on header information, not shown, of the received packet in reception buffer 3 (S1). When it is determined that the packet is not a valid packet, the series of processing is completed. When it is determined to be a valid packet, address analysis section 5 compares the transmission destination address indicated by transmission destination information A2 of the received packet with self address 71 in address management section 7 and determines whether the received packet is addressed to itself. When the addresses match, it means that the received packet is addressed to the equipment itself, and therefore the transmission source address indicated by transmission source information A1 of the received packet is stored as transmission source address 72 in address management section 7 (S2). When the addresses do not match, the processing is completed.

Thereafter, command analysis section determines whether command A3 of the received packet is a function inquiry command or not (S3).

When it is determined that command A3 is a function inquiry command, function retrieval section 9 retrieves a plurality of functions B1 in function storage 10 based on the content A4 of the received packet, and when a function Bi which corresponds to the inquired function is stored in storage 10, control is passed to answer packet generating section 8 (S4).

When it is determined that command A3 of the received packet is not a function inquiry command (NO in S3), command analysis section 6 determines whether command A3 is a CONTENTS inquiry command or not (S5).

When it is determined that command A3 is a CONTENTS inquiry command (YES in S5), CONTENTS retrieval section 11 retrieves CONTENTS data in CONTENTS storage 12 based on the content A4 of the received packet. As a result of retrieval, if CONTENTS data which corresponds to the inquired content is found stored in storage 12, the control is passed to answer packet generating section 8.

Meanwhile, when it is determined that command A3 is not a CONTENTS inquiry command (NO in S5), the command is applied to I/F 95 of function implementing unit 39, and executed under the control of CPU 91 (S8).

Meanwhile, answer packet generating section 8 generates an answer packet shown in FIG. 4E having self address 71 and transmission source address 72 in address management section 7 as transmission source information A1 and transmission destination information A2, command A3 as a command indicating that it is an answer to an inquiry, content A4 as specific content of answer to the inquiry, and stores the generated packet in transmission buffer 2 (S9).

Thereafter, I/F 1 transmits the answer packet stored in transmission buffer 2 to transmission path 37.

Here, answer packet generating section 8 generates the answer packet shown in FIG. 8A when the received packet is the function inquiry packet such as shown in FIG. 4B, and generates an answer packet of FIG. 8B if the received packet is a CONTENTS data inquiry packet such as shown in FIG. 4C.

In the answer packet shown in FIG. 8A, detailed information B2 corresponding to the function Bi shown in FIG. 5 which corresponds to the content inquired as content A4 is stored. In the answer packet shown in FIG. 8B, time C3 and operation history C4 of FIG. 7B which correspond to the content inquired as content A4 are stored.

When the answer packet is received by each of the electrical equipments, the received packet is subjected to process steps S1 to S8 shown in FIG. 10, applied to function implementing unit 39 from command analysis section 6, and the content of the packet is displayed at output section 97. Therefore, the user can recognize the ID, or address, function and information of CONTENTS of each of the electrical equipments by the display.

When the inquired function or CONTENTS data is not obtained as a result of retrieval by function retrieval section 9 or CONTENTS retrieval section 11, the received packet may be discarded, or an answer packet such as shown in FIG. 4E storing content A4 indicating that the inquired function or CONTENTS is absent, may be transmitted.

In the first embodiment, each of the electrical equipments retrieves information related to the function of itself or CONTENTS data stored in itself, and transmits the result of retrieval in the form of an answer packet storing an address specifying the equipment itself, in response to an external inquiry. Therefore, when a function of the electrical equipment or other electrical equipments in the network is to be used, the address of an electrical equipment having the object function or CONTENTS to be controlled can be readily obtained. Therefore, in the network, a table storing addresses of respective electrical equipments and information related to functions of respective electrical equipments in correspondence to each other is unnecessary.

Further, in the network, functions of respective electrical equipments can be shared on the network without the necessity of using a special control apparatus such as a central control unit. Further, function information or CONTENTS data is inquired as needed, and therefore updating of the table at the time of addition or omission of an electrical equipment to and from the network is not necessary.

(Second Embodiment)

Figure 11:
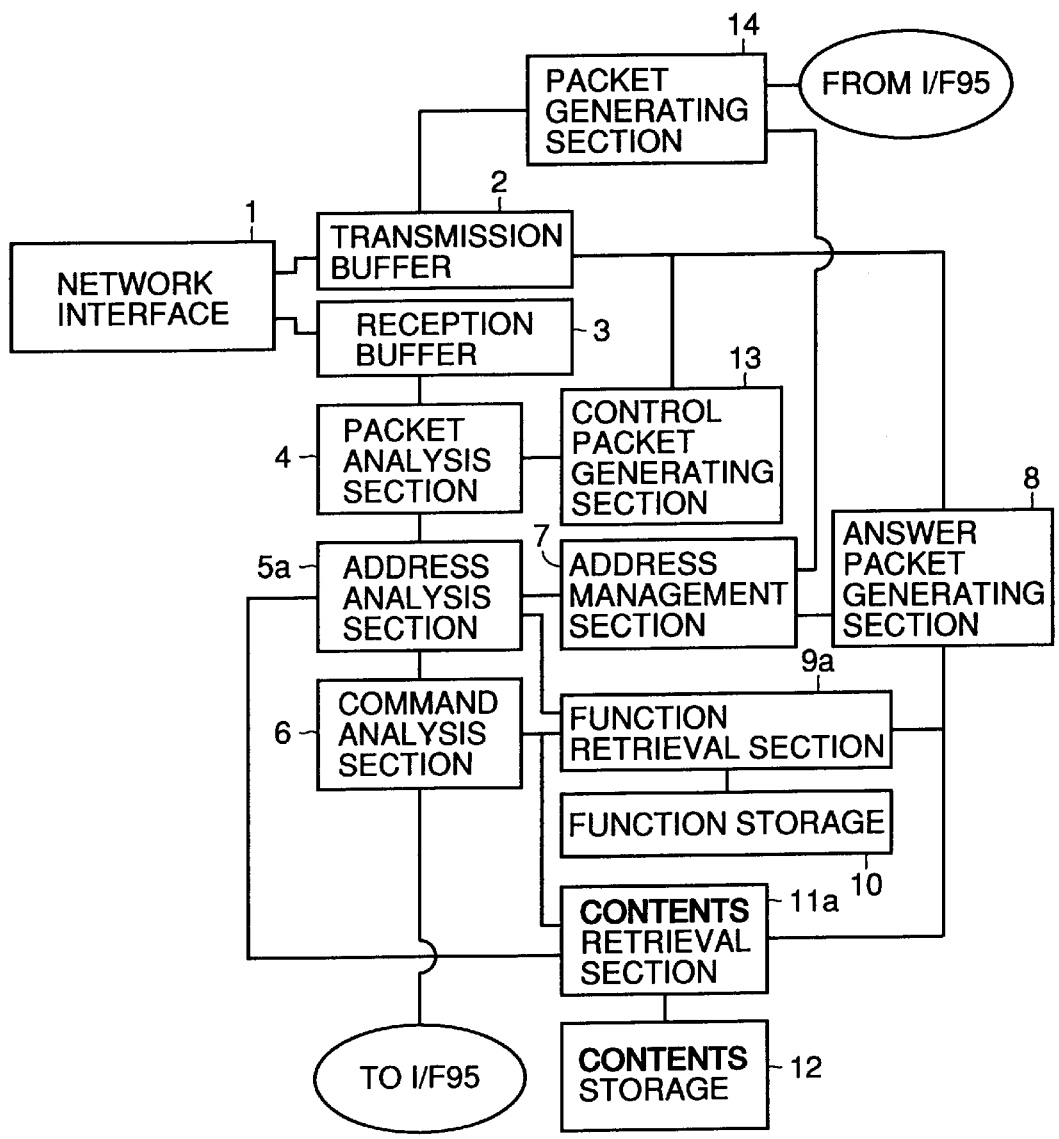
FIG. 11 shows a system configuration of the communication control unit of FIG. 2 in accordance with the second embodiment of the present invention.

FIG. 11 shows a system configuration of communication control unit 38 shown in FIG. 2 in accordance with the second embodiment of the present invention. The configuration of FIG. 11 is different from that of FIG. 3 in that address analysis section 5, function retrieval section 9 and CONTENTS retrieval section 11 of FIG. 3 are replaced by address analysis section 5a, function retrieval section 9a and CONTENTS retrieval section 11a as shown in FIG. 11, so that retrieval of function information and retrieval of CONTENTS data are performed immediately after address analysis of the received packet. Other portions of FIG. 11 are common to FIG. 3, and therefore description thereof is not repeated.

Figure 12:
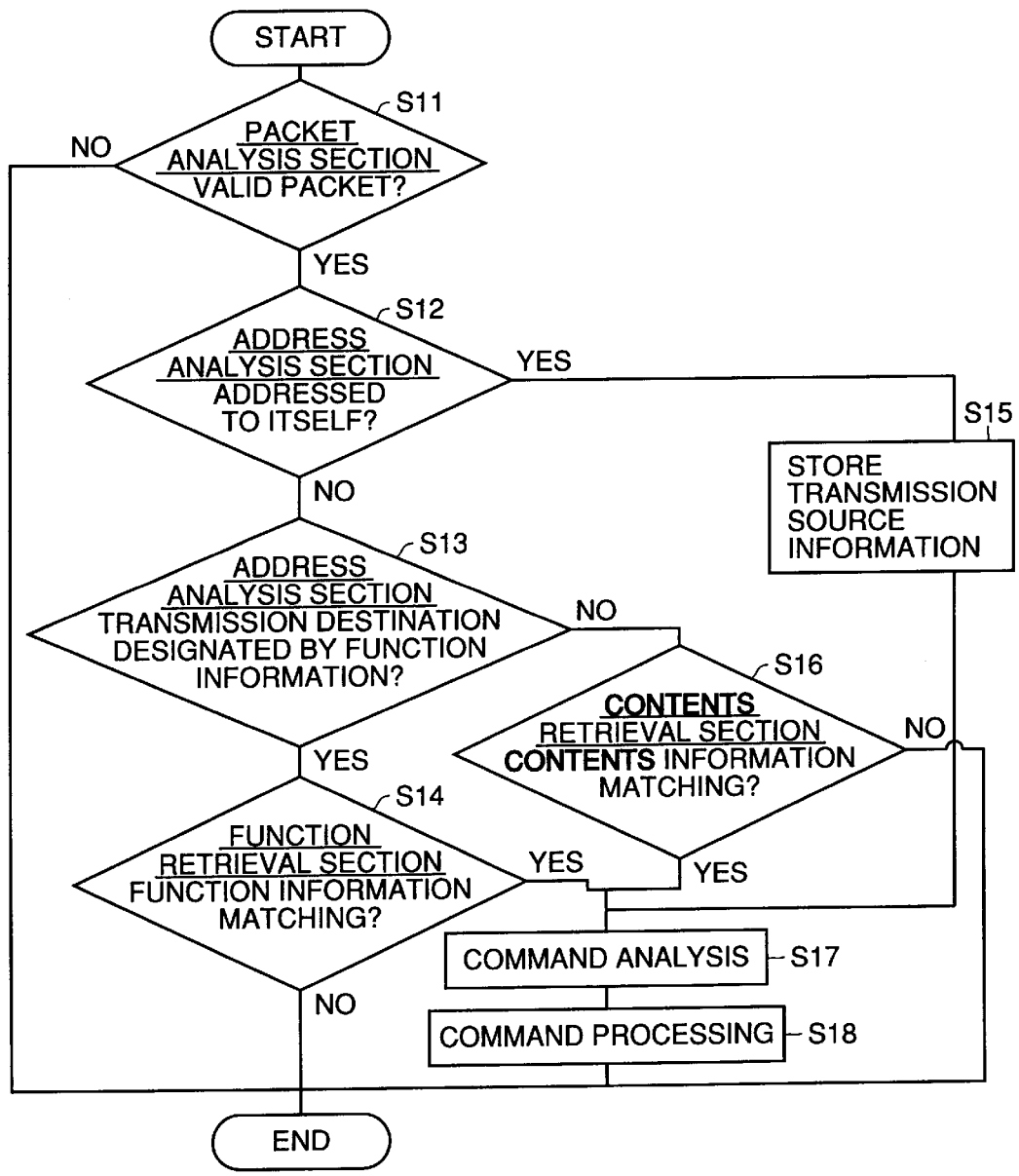
FIG. 12 is a flow chart of a packet reception processing for each of the electrical appliances in accordance with the second embodiment of the present invention.
Figure 13:
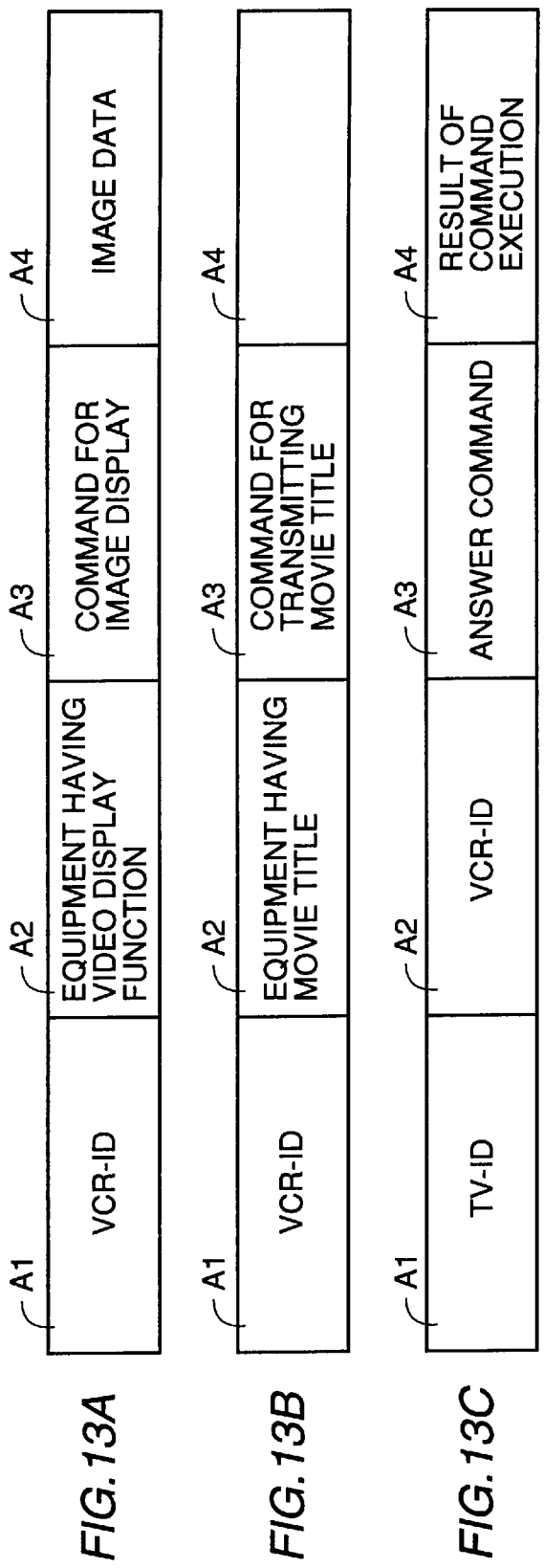
FIGS. 13A to 13C show two control packets and an answer packet in accordance with the second embodiment of the present invention.

FIG. 12 is a flow chart of packet reception processing at each of the electrical equipments in accordance with the second embodiment of the present invention. FIGS. 13A to 13C show control packets and an answer packet in accordance with the second embodiment of the present invention. The control packet shown in FIG. 13A stores an address of VCR 36 of FIG. 1 as transmission source information A1, information of the content "equipment having video display function" as transmission destination information A2, "a command for displaying image" as command A3, and image data to be displayed in connection with command A3 as content A4. The control packet shown in FIG. 13B stores an address of VCR 36 of FIG. 1 as transmission source information A1, information of the content "equipment having a movie title" as transmission destination information A2, and "a command for transmitting a movie title" as command A3. The answer packet shown in FIG. 13C stores an address of TV 31 of FIG. 1 as transmission source information A1, an address of VCR 36 as transmission destination information A2, an answer command as command A3, and result of execution of the received command as content A4. The answer packet of FIG. 13C is a packet for transmitting result of execution of command A3 in the control packet of FIG. 13A or FIG. 13B.

First, in accordance with the flow chart shown in FIG. 9, the control packet shown in FIG. 13A is generated from VCR 36 of FIG. 1 and transmitted to all other electrical equipments through transmission path 37.

At each equipment, the control packet of FIG. 13A is received through I/F 1 and stored in reception buffer 3.

Packet analysis section 4 determines whether the received packet is a valid packet or not based on header information of the received packet (S11). If it is not a valid packet, the series of processings is completed. When it is a valid packet, address analysis section 5a determines whether transmission destination information A2 of the received packet matches the self address 71 of address management section 7. When the addresses match, the transmission source information A1 of the received packet is stored as transmission source address 72 in address management section 7 (S15), and command A3 is analyzed and executed (S17, S18).

Meanwhile, when transmission destination information A2 does not match self address 71, address analysis section 5a determines whether transmission destination information A2 is indicated by function information or not (S13). When transmission destination information A2 is indicated by using the function information, function retrieval section 9a determines whether the function information indicated by transmission destination information A2 matches with any of the information stored in function storage 10. If the information matches, command A3 is analyzed and executed (S17, S18). If not, the series of processings is completed.

When transmission destination information A2 is not indicated by the function information, CONTENTS retrieval section 11a determines whether the information indicated by transmission destination information A2 matches any of the information related to the CONTENTS in CONTENTS storage 12 (S16). When the information matches, command A3 is analyzed and executed (S17, S18). If not, the series of processings is completed.

Analysis and execution of the command shown in FIG. 12 will be described. When the received packet is the control packet shown in FIG. 13A, for example, command A3 for image display is executed in "equipment having video display function" indicated by transmission destination information A2, that is, TVs 31 and 32 shown in FIG. 1 having the video display function, and image data of content A4 is given on a display of function unit 98, for example. At this time, the answer packet shown in FIG. 13C may be generated by answer packet generating section 8 to transmit the result of execution of command A3 of the age received packet.

When the received packet is the control packet shown in FIG. 13B, for example, command A3 for transmitting a movie title is executed in "equipment having a movie title" indicated by transmission destination information A2, that is, VCR 36 of FIG. 1 having a movie title as CONTENTS data. At this time, the answer packet of FIG. 13C storing a movie title in CONTENTS storage 12 as content A4 may be generated and transmitted by answer packet generating section 8.

When the equipment which has received the packet does not correspond to the equipment designated by transmission designation information A2 of the received packet, the received packet may be discarded. Alternatively, an answer packet storing information that the inquired function or CONTENTS data is absent may be transmitted.

In this manner, in the second embodiment, retrieval of a function or CONTENTS is possible at the time of analysis of transmission destination information A2 of the received packet. Therefore, it is possible to collectively designate as object equipments for executing command A3, all the electrical equipments having a certain function information or CONTENTS data such as "all equipments capable of video output" or "all equipments having movie title of ***", for example.

Therefore, when all the equipments that have a certain function information or CONTENTS data are to be controlled, the number of control packets to be transmitted can be reduced, and communication medium such as transmission path 37 can effectively be utilized.

(Third Embodiment)

Figure 14:
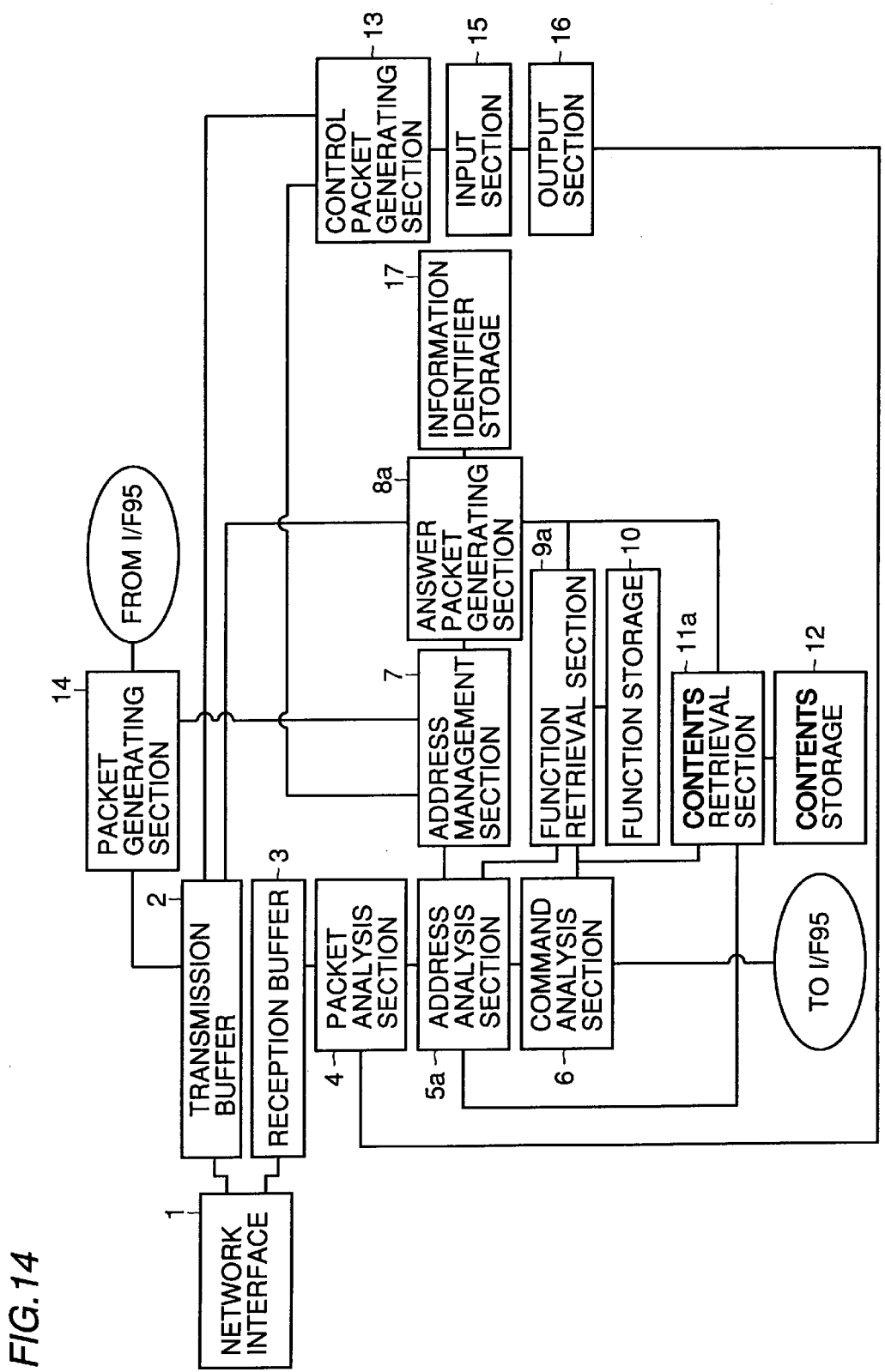
FIG. 14 shows a system configuration of the communication control unit of FIG. 2 in accordance with the third embodiment of the present invention.

FIG. 14 shows system configuration of communication control unit 38 of FIG. 2 in accordance with the third embodiment. The system configuration of FIG. 14 differs from that of FIG. 11 in that answer packet generating section 8 of FIG. 11 is replaced by answer packet generating section 8a, and that an input section 15, an output section 16 and an information identifier storage 17 are added. Except these points, the configuration is the same as that of FIG. 11, and description thereof is not repeated.

Information identifier storage 17 stores in advance identifier which can be recognized by the user, such as a character or a numeral for identifying respective ones of the function information and CONTENTS data stored in function storage 10 and CONTENTS storage 12. Answer packet generating section 8a stores as content A4, an information identifier in information identifier storage 17 corresponding to the retrieved function information or CONTENTS data in an answer packet, when the answer packet is generated.

The information identifier may be set in information identifier storage 17 by manual input, or by automatically generating and inputting the identifier from part of the function information and CONTENTS data in function storage 10 and CONTENTS storage 12.

Input section 15 is for external data input operated by the user, such as a keyboard. Output section 16 is for external data output, such as a display.

Figure 15:
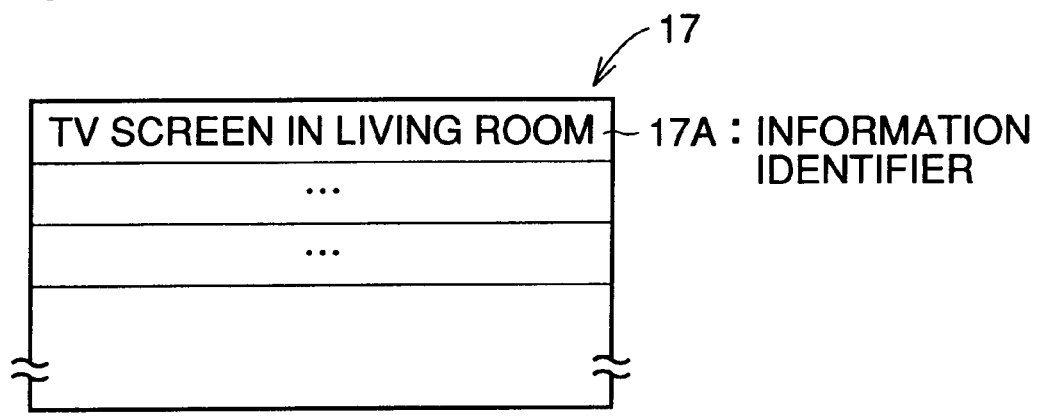
FIG. 15 shows contents of the information identifier storage shown in FIG. 14.

FIG. 15 shows contents of information identifier storage 17 shown in FIG. 14. FIG. 15 shows an example of information identifier storage 17 of TV 31 shown in FIG. 1. In the example shown in FIG. 15, the video output function of TV 31 corresponds to information identifier 17A that "TV screen placed in the living room."

Figure 16:
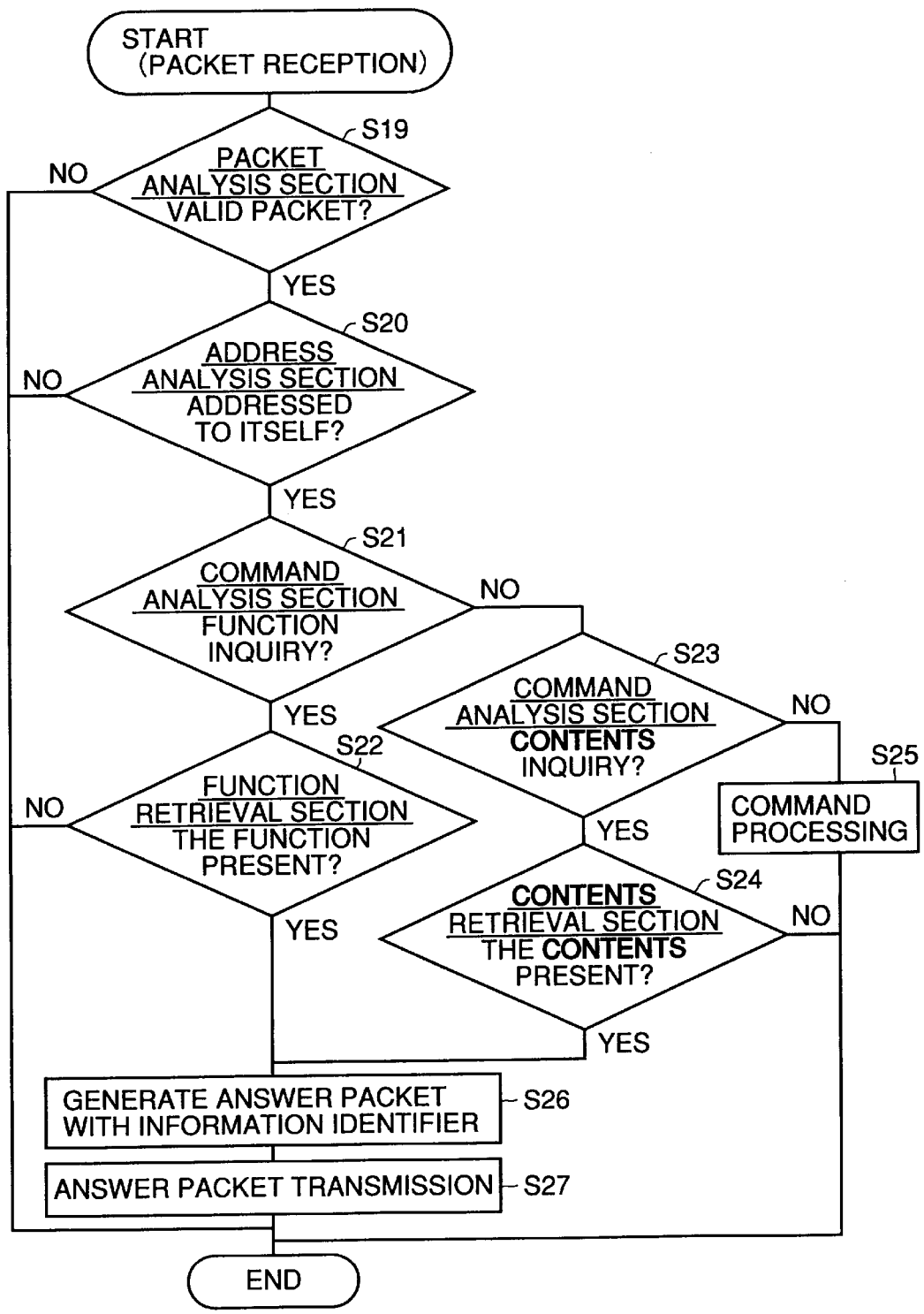
FIG. 16 is a flow chart showing an answer packet transmission process in response to a packet reception in accordance with the third embodiment of the present invention.
Figure 17:
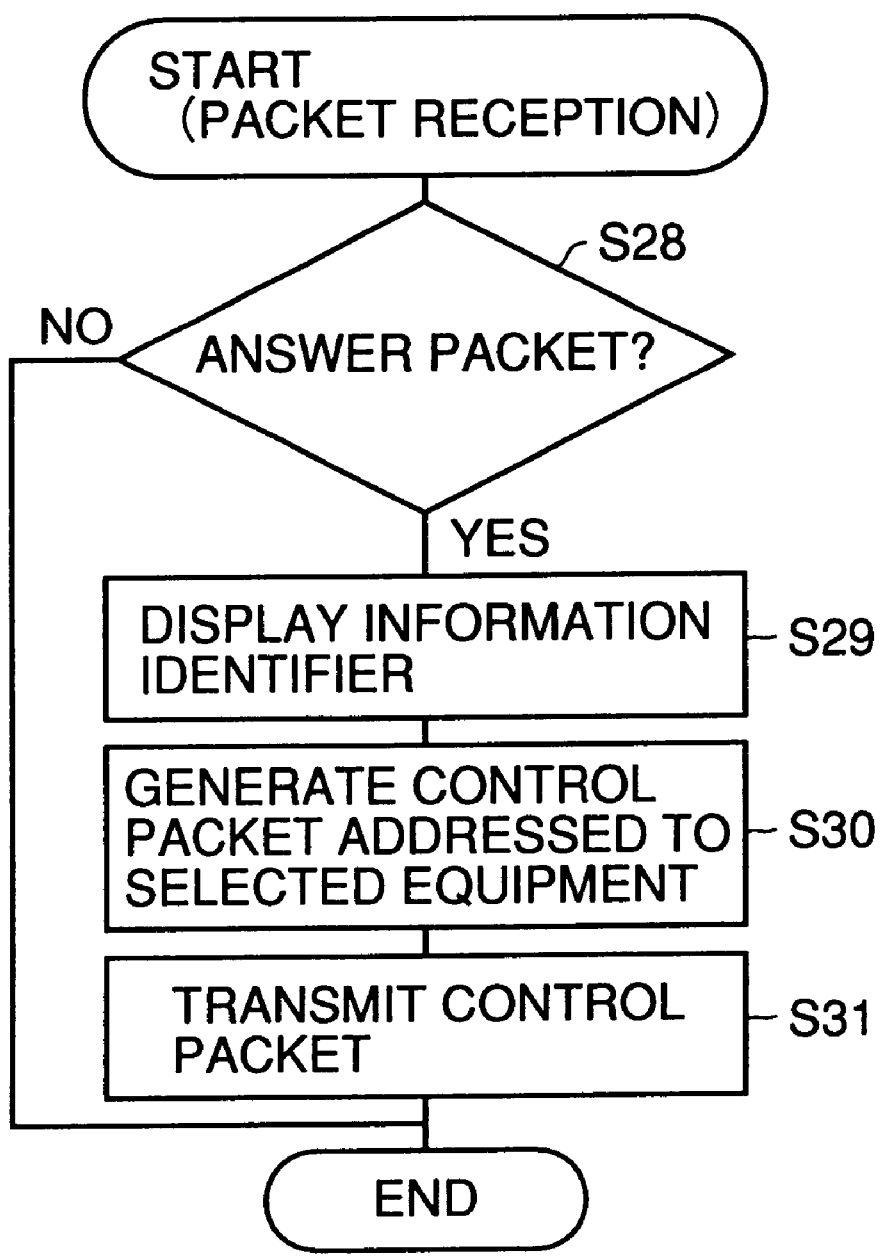
FIG. 17 is a flow chart showing a control packet transmission process in response to a packet reception in accordance with the third embodiment of the present invention.

FIG. 16 is a flow chart of an answer packet transmission in response to a packet reception in accordance with the third embodiment of the present invention. FIG. 17 is a flow chart of a control packet transmission process in response to a packet reception in accordance with the third embodiment of the present invention.

Figure 18:
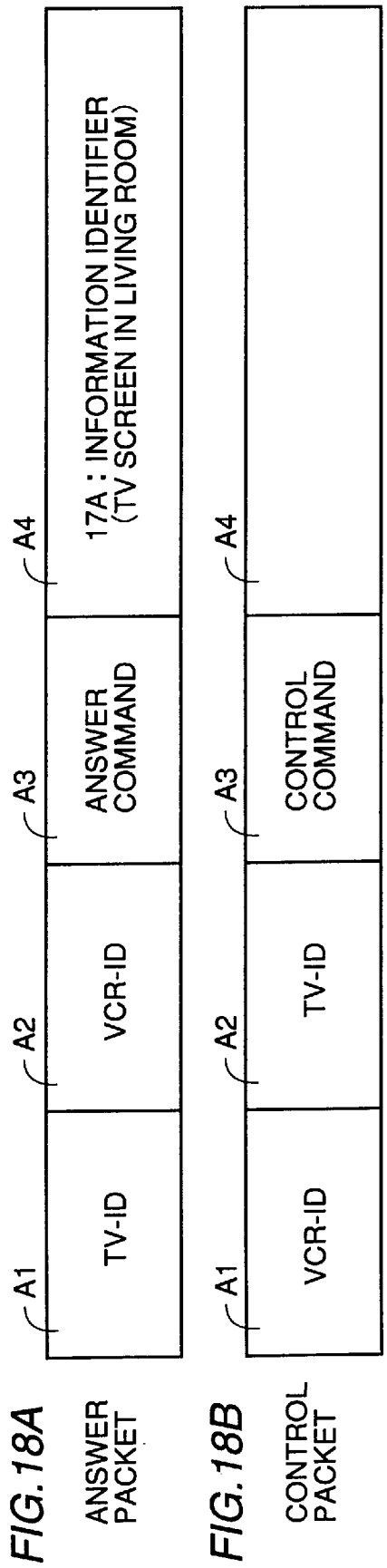
FIGS. 18A and 18B show examples of an answer packet and a control packet transmitted in accordance with the flow charts of processing shown in FIGS. 16 and 17.

FIGS. 18A and 18B show examples of an answer packet and a control packet transmitted in accordance with the flow charts of FIGS. 16 and 17.

First, assume that VCR 36 generates and transmits an inquiry packet of FIG. 4B to each of the electrical equipments in the system, as in the first embodiment. At this time, each equipment receives and processes the inquiry packet in accordance with the flow chart of FIG. 16.

The processes of steps S19 to S25 of FIG. 16 are the same as those of steps S1 to S8 of FIG. 10, and therefore description is not repeated.

Each equipment generates an answer packet of FIG. 18A at answer packet generating section 8a, when the received inquiry packet is addressed to itself and a function information indicated by content A4 of the inquiry packet is in the function storage 10 (S26). Answer packet generating section 8a reads information identifier 17A corresponding to the function information obtained from function storage 10, from information identifier storage 17, and stores the read identifier as content A4 in the answer packet. In this manner, the answer packet of FIG. 18A is generated and transmitted through transmission buffer 2 (S27).

In this case, the answer packet of FIG. 18A storing information identifier 17A in the similar manner is also transmitted from each of the equipments other than TV 31 that has the function information or CONTENTS data matching the inquired content A4. Therefore, VCR 36 receives answer packets from a plurality of equipments.

Referring to FIG. 17, information identifier A is extracted by packet analysis section 4 from each of the received answer packets, and the extracted identifier is displayed on output section 16, in VCR 36 (S28, S29). The user selects a desired information identifier 17A among the plurality of information identifiers 17A displayed on output section 16, by using input section 15. Control packet generating section 13 generates a control packet of FIG. 18B addressed to the equipment which has the selected information identifier 17A, and transmits the control packet through transmission buffer 2 (S30, S31).

Control packet generating section 13 reads, based on the selected identifier 17A, an address 73B of a corresponding equipment 73A from address table 73 in address management section 7. Based on the read address, the self address 71 and a control command input by the user through input section 15, a control packet of FIG. 18B is generated.

In the equipment which received the control packet transmitted from VCR 36, a process in accordance with command A3 of the received control packet is executed in accordance with the flow chart of FIG. 16.

In accordance with the third embodiment, when there are answers from a plurality of equipments to the inquiry, it is possible for the user to select a desired equipment to be controlled, by presenting information identifiers 17A of the plurality of equipments which provided the answers.

(Fourth Embodiment)

Figure 19:
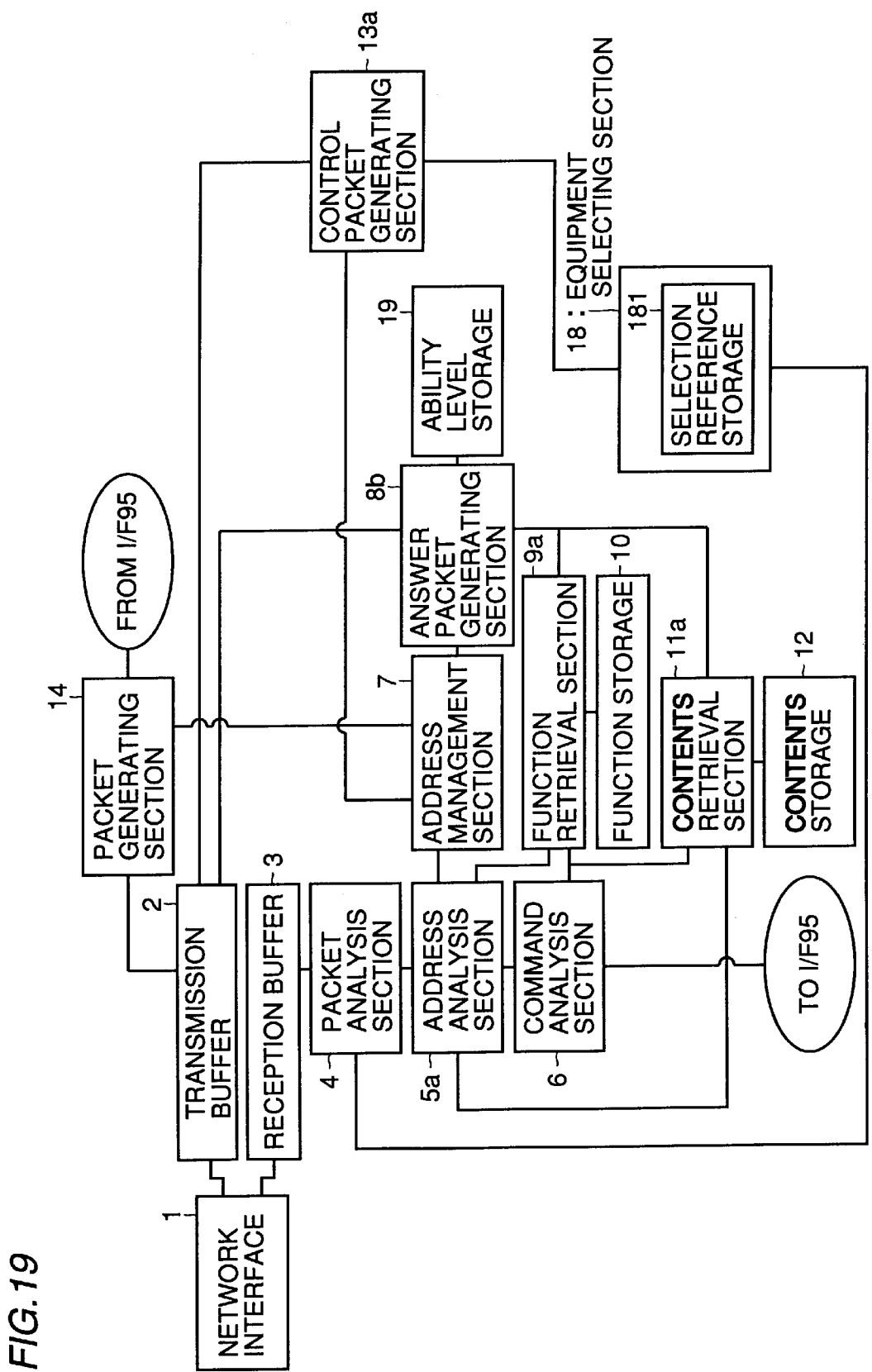
FIG. 19 shows a system configuration of the communication control unit of FIG. 2 in accordance with the fourth embodiment of the present invention.

FIG. 19 shows system configuration of communication control unit 38 shown in FIG. 2 in accordance with the fourth embodiment of the present invention.

The system configuration of FIG. 19 differs from that of FIG. 14 in that an answer packet generating section 8b is provided in place of answer packet generating section 8a, a control packet generating section 13a and an equipment selecting section 18 are provided in place of control packet generating section 13, input section 15 and output section 16, and an ability level storage 19 is provided in place of information identifier storage 17. Except these points, the configuration of FIG. 19 is the same as that of FIG. 14, and description thereof is not repeated.

Figure 20:
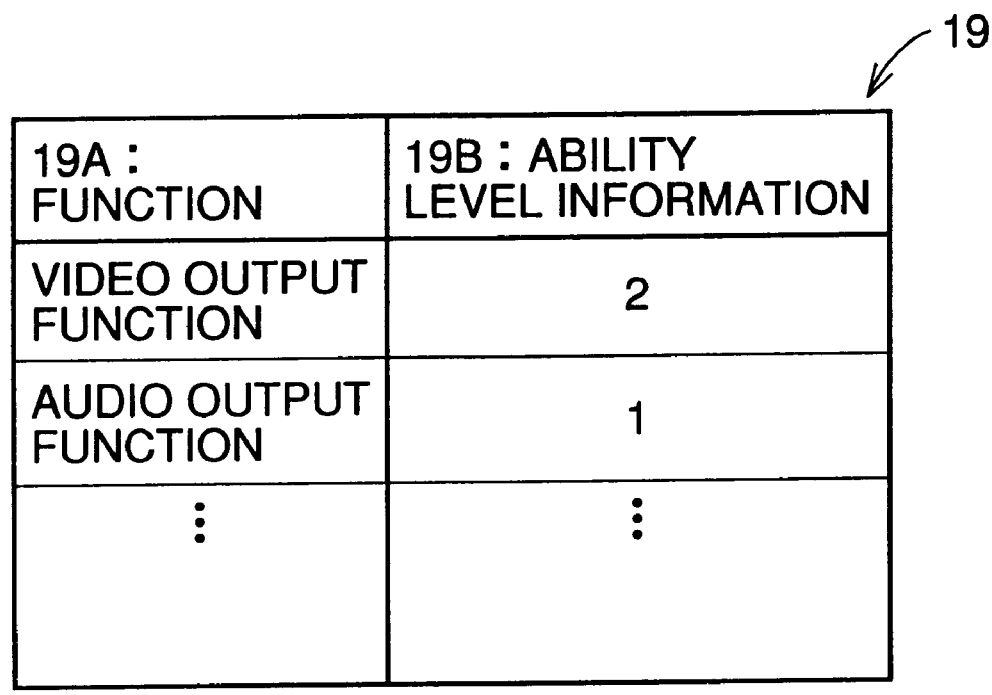
FIG. 20 shows contents in an ability level storage of FIG. 19.

FIG. 20 shows the content of ability level storage 19 shown in FIG. 19. Ability level storage 19 stores ability level information 19B indicating, by numerical value, for example, how much ability the corresponding equipment has for implementing respective ones of functions 19A. When cone or more equipments have the same function, ability level information 19b represents relative ability level of the equipments when the function is implemented by respective equipments.

Answer packet generating section 8b generates an answer packet storing as content A4 the ability level information 19B in ability level storage 19. At this time, the ability level information stored in the answer packet is determined based on the result of retrieval at function retrieval section 9a.

Function selecting section 18 has a selection reference storage 181 and it compares ability level information 19b of the received packet with a selection reference level stored in advance in storage 181 and selects the equipment as the control packet transmission destination, based on the result of comparison.

Control packet generating section 13a generates a control packet for controlling the equipment selected by equipment selecting section 18.

Ability level information 19B in ability level storage 19 may be set by manual input, may be set fixedly equipment by equipment in advance, or may be set when an equipment is connected to the network, and the level, for video output function, for example, may be "5" for a large sized TV and "1" for a small portable TV.

Figure 21:
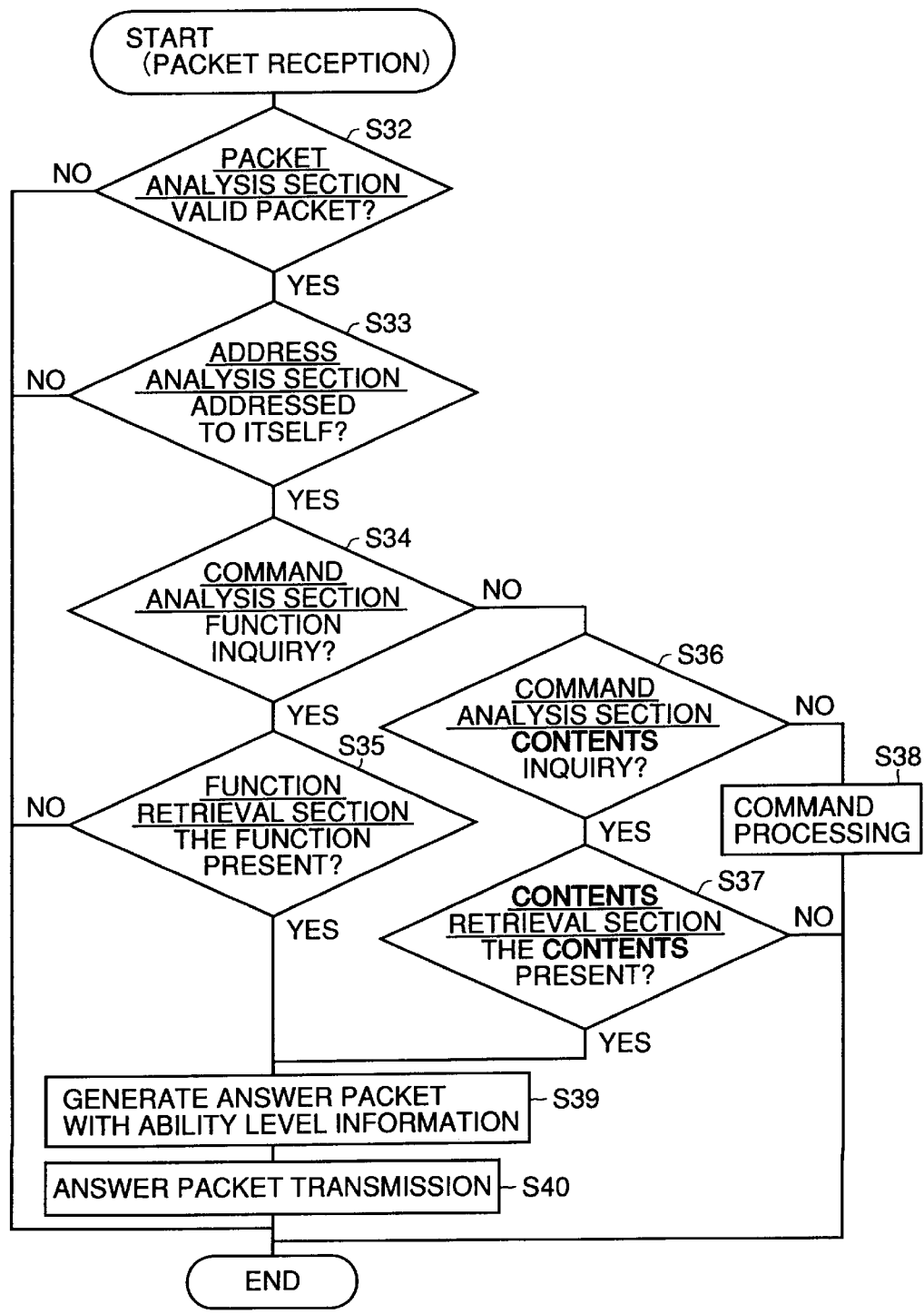
FIG. 21 is a flow chart showing an answer packet transmission process in response to a packet reception in accordance with the fourth embodiment of the present invention.
Figure 22:
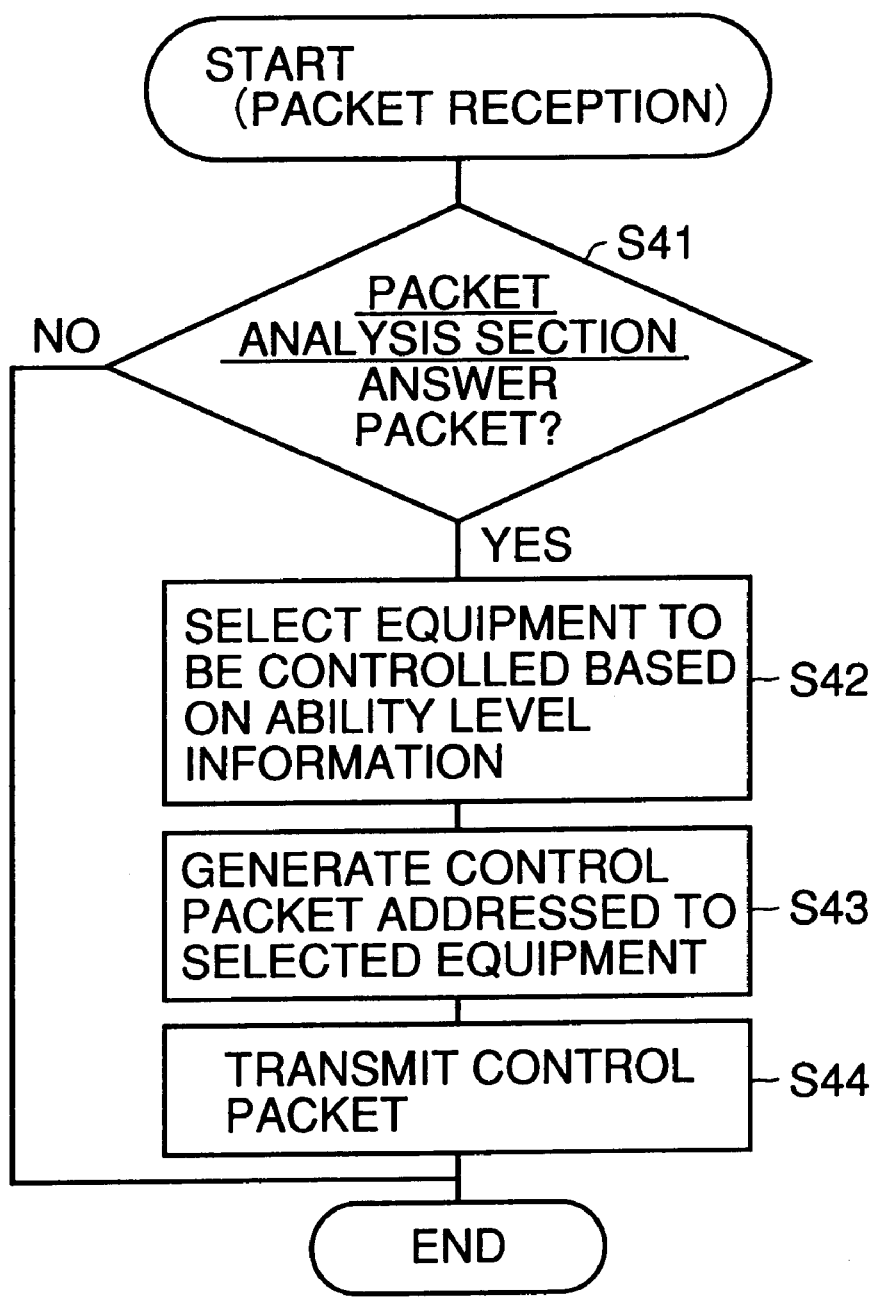
FIG. 22 is a flow chart showing a control packet transmission process in response to a packet reception in accordance with the fourth embodiment of the present invention.

FIG. 21 is a flow chart of an answer packet transmission in response to a packet reception in accordance with the fourth embodiment of the present invention. FIG. 22 is a flow chart of a control packet transmission process in response to a packet reception in accordance with the fourth embodiment of the present invention.

Figure 23:
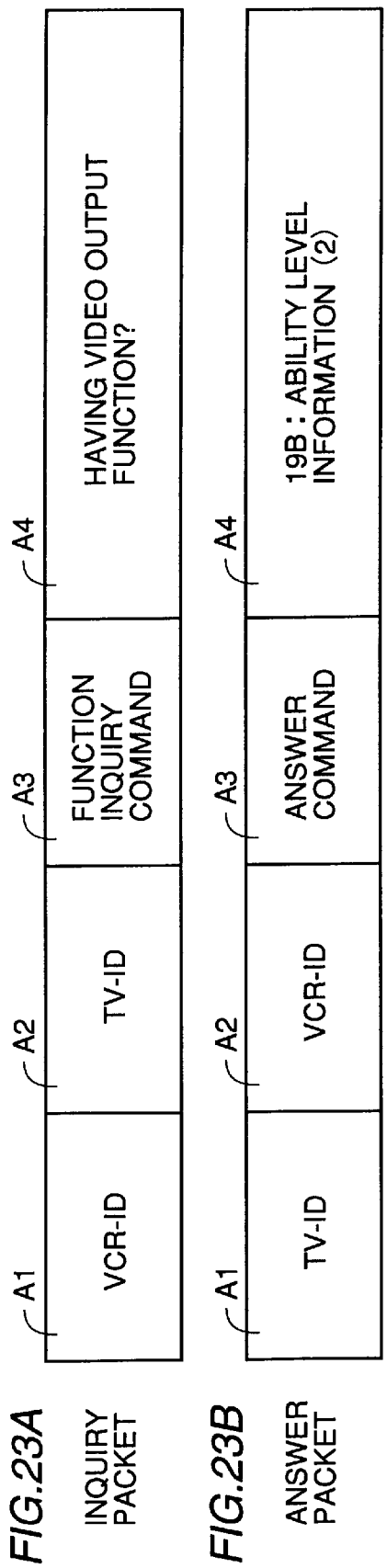
FIGS. 23A and 23B show examples of an inquiry packet and an answer packet processed in accordance with the flow charts of FIGS. 21 and 22.

FIGS. 23A and 23B show examples of an inquiry packet and an answer packet processed in accordance with the flow chart of FIGS. 21 and 22.

First, assume that VCR 36 generates and transmits an inquiry packet of FIG. 23A to each equipment in the system inquiring "whether the equipment has video output function".

At this time, each equipment receives and processes the inquiry packet in accordance with the flow chart of FIG. 21. The content of processing of steps S32 to S38 of FIG. 21 are the same as those of steps S1 to S8 of FIG. 10. Therefore, description is not repeated.

Each equipment generates an answer packet of FIG. 23B at answer packet generating section 8b when the received inquiry packet is addressed to it and function information indicated by content A4 in the inquiry packet is in function information storage 10.

First, answer packet generating section 8b generates the answer packet of FIG. 23B storing self address 71 in address management section 7, transmission source address 72, and ability level information 19B corresponding to the inquired function 19A in ability level storage 19 as transmission source information A1, transmission destination information A2 and content A4, respectively (S39). The generated answer packet is transmitted through transmission buffer 2 (S40).

In VCR 36, as it transmitted the inquiry packet of FIG. 23A, it receives answer packet of FIG. 23B. Referring to FIG. 22, in packet analysis section 4, ability level information 19B is extracted from the received answer packet and the extracted information is applied to equipment selecting section 18 (S41).

In equipment selecting section 18, based on the applied ability level information 19B and selection reference of selection reference storage 181, whether or not the equipment of the answer packet transmission source is to be selected as the object equipment of control. When a plurality of answer packets are received and a plurality of pieces of ability level information 19B are obtained, for example, an equipment having the highest level of video output function is selected as the object of control, provided that the selection reference is set to select an equipment of highest ability level (S42).

Selecting section 18 designates which equipment corresponding to which answer packet received at what order is selected. Accordingly, control packet generating section 13a reads the corresponding transmission source address 72 and self address 71 to that answer packet which is designated by address management section 7, and generates a control packet of FIG. 4D using these read addresses and a control command which has been set or applied in advance (S43).

The generated control packet is stored in transmission buffer 2, and thereafter transmitted through I/F 1 (S44). Therefore, in the selected equipment, the control packet is received, and process in accordance with the content of the received packet is performed.

In the fourth embodiment, based on the ability level information 19B in the answer packet, an equipment suitable for realizing the inquired function is automatically selected.

(Fifth Embodiment)

Figure 24:
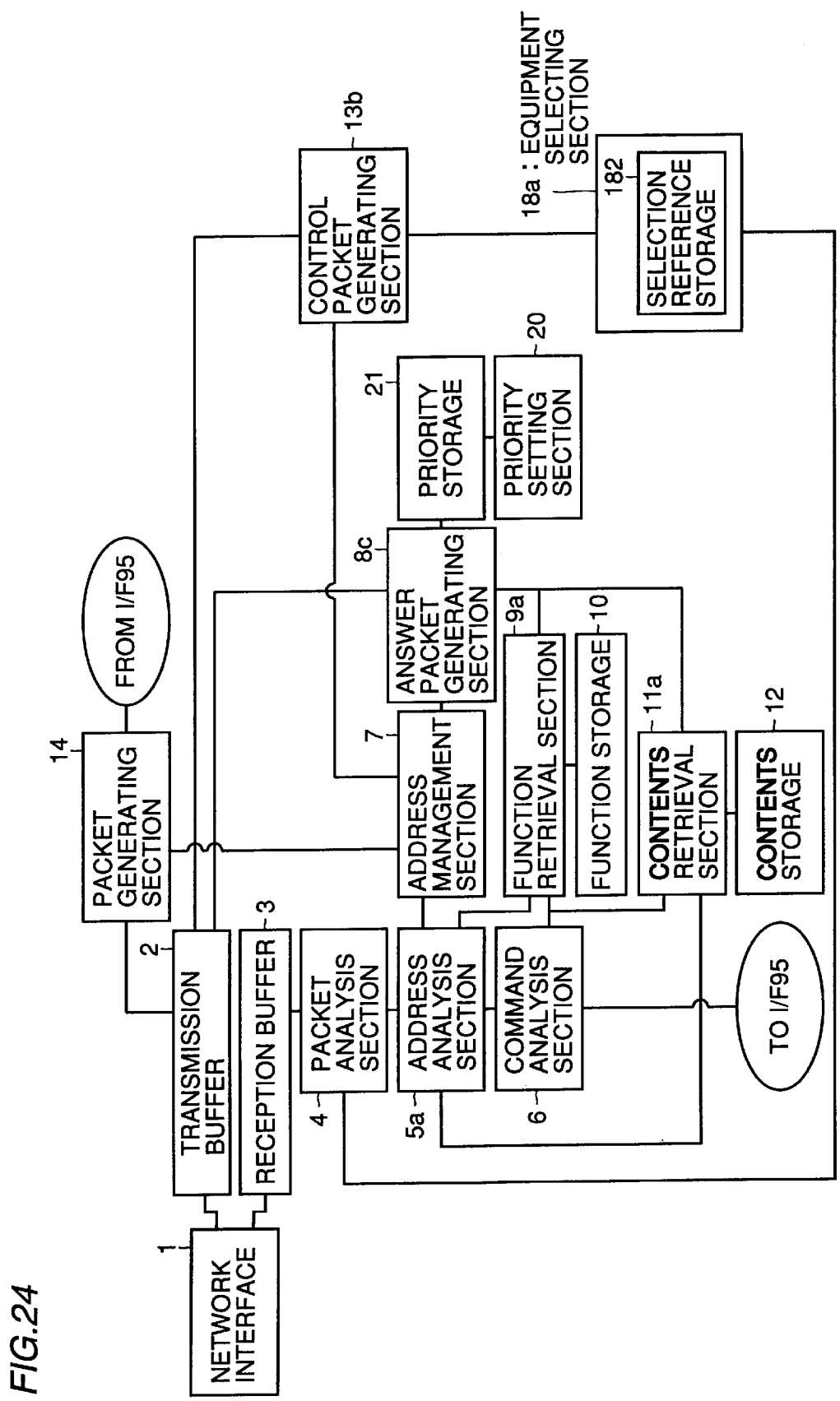
FIG. 24 shows a system configuration of the communication control unit of FIG. 2 in accordance with the fifth embodiment of the present invention.

FIG. 24 shows system configuration of communication control unit 38 of FIG. 2 in accordance with the fifth embodiment of the present invention.

The system configuration of FIG. 24 is different from that of FIG. 19 in that an answer packet generating section 8c, a control packet generating section 13b and an equipment selecting section 18a are provided in place of answer packet generating section 8b, control packet generating section 13a and equipment selecting section 18, and that a priority setting section 20 and a priority storage 21 are provided in place of ability level storage 19. Other portions of FIG. 24 are the same as those of FIG. 19, and description thereof is not repeated.

In the present embodiment, priority of equipment executing a function is set in advance in priority setting section 20 and stored in priority storage 21, function by function. In answer packet generating section 8c, an answer packet storing priority information in priority storage 21 is generated.

Figure 25:
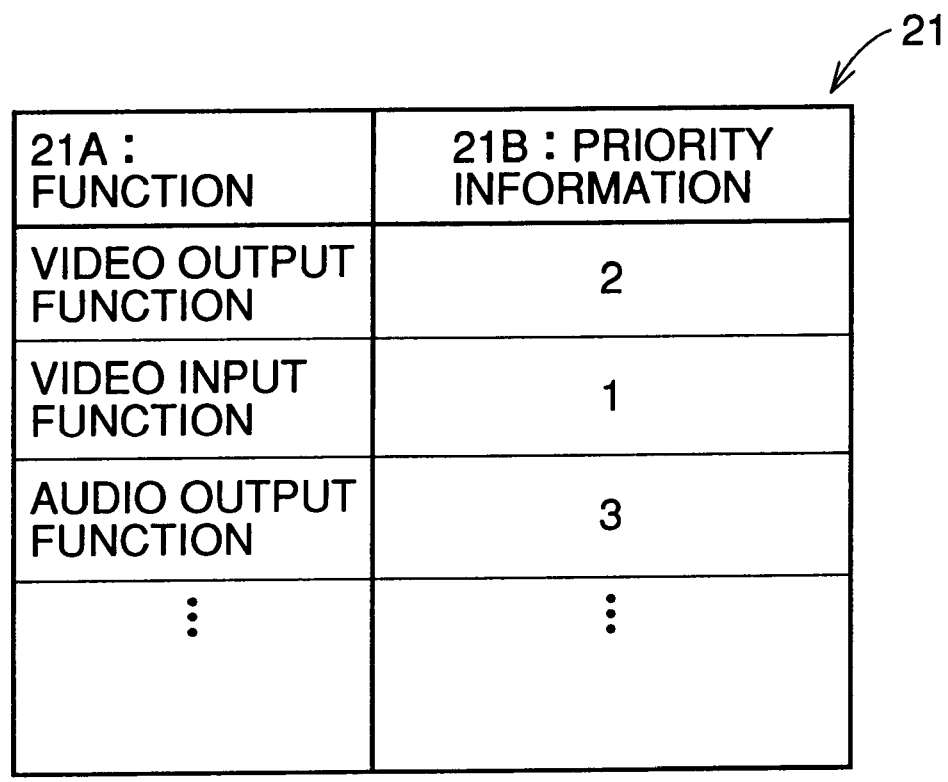
FIG. 25 shows a content of a priority storage shown in FIG. 24.

FIG. 25 shows contents of priority storage 21 of FIG. 24. Referring to FIG. 25, in priority storage 21, priority information 21B is stored indicating, in numerical value, for example, priority of implementation of each equipment for respective functions 21A.

In each equipment, priority information of video output function, for example, is set by priority setting section 20 in advance, such that TV 31 placed in the living room shown in FIG. 1 has the priority of "1" and TV 32 placed in a room in the second floor has the priority of "2". In this manner, for each function of the equipments, priority information 21B of implementing the function is set equipment by equipment and stored in priority storage 21. The priority may be determined arbitrarily by manual input, or it may be determined in accordance with the installed place of the equipment.

In the fourth embodiment described above, the ability level information represents ability of each equipment to implement a function. The priority of the present invention is different. The priority indicates the equipment which is used with priority when the function is to be implemented. Therefore, both ability level information and priority information may be provided and ability level information and priority information may be used appropriately in accordance with the operation performed by implementation of a function or in accordance with the state or time of use.

Answer packet generating section 8c generates an answer packet storing as content A4, priority information 21B of priority storage 21. At this time, the stored priority information 21B is determined based on the result of retrieval by function retrieval section 9a.

Equipment selecting section 18a has selection reference storage 182, and compares priority information 21B of the received packet with the selection reference level stored in advance in storage 182. Based on the result of comparison, the selecting section 18a selects an equipment of control packet transmission destination, and applies the result of selection to control packet generating section 13b.

Control packet generating section 13b generates a control packet for controlling the equipment selected based on the applied result of selection.

Figure 26:
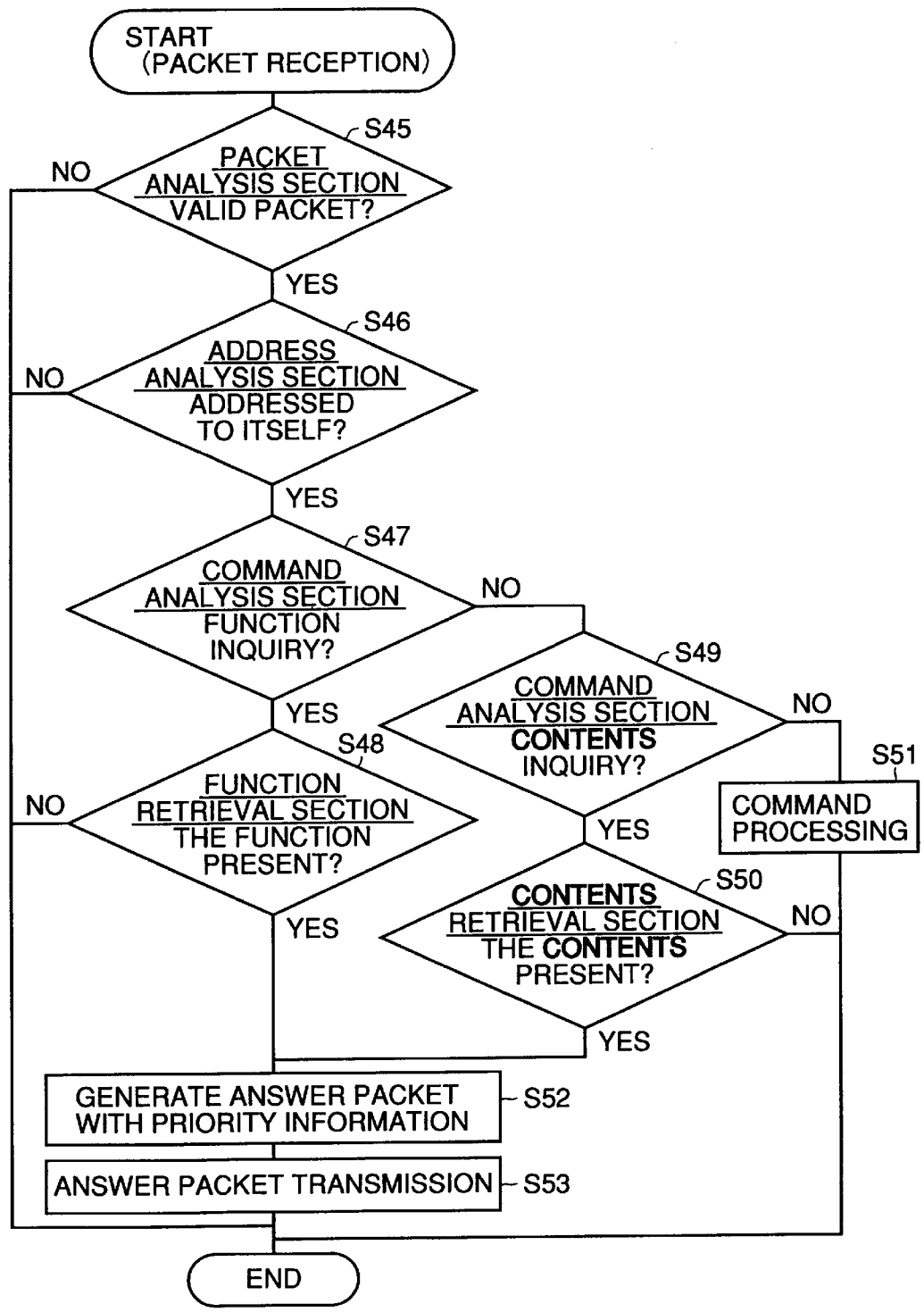
FIG. 26 is a flow chart showing an answer packet transmission process in response to a packet reception in accordance with the fifth embodiment of the present invention.

FIG. 26 is a flow chart of an answer packet transmission in response to a packet reception in accordance with the fifth embodiment of the present invention.

Figure 27:
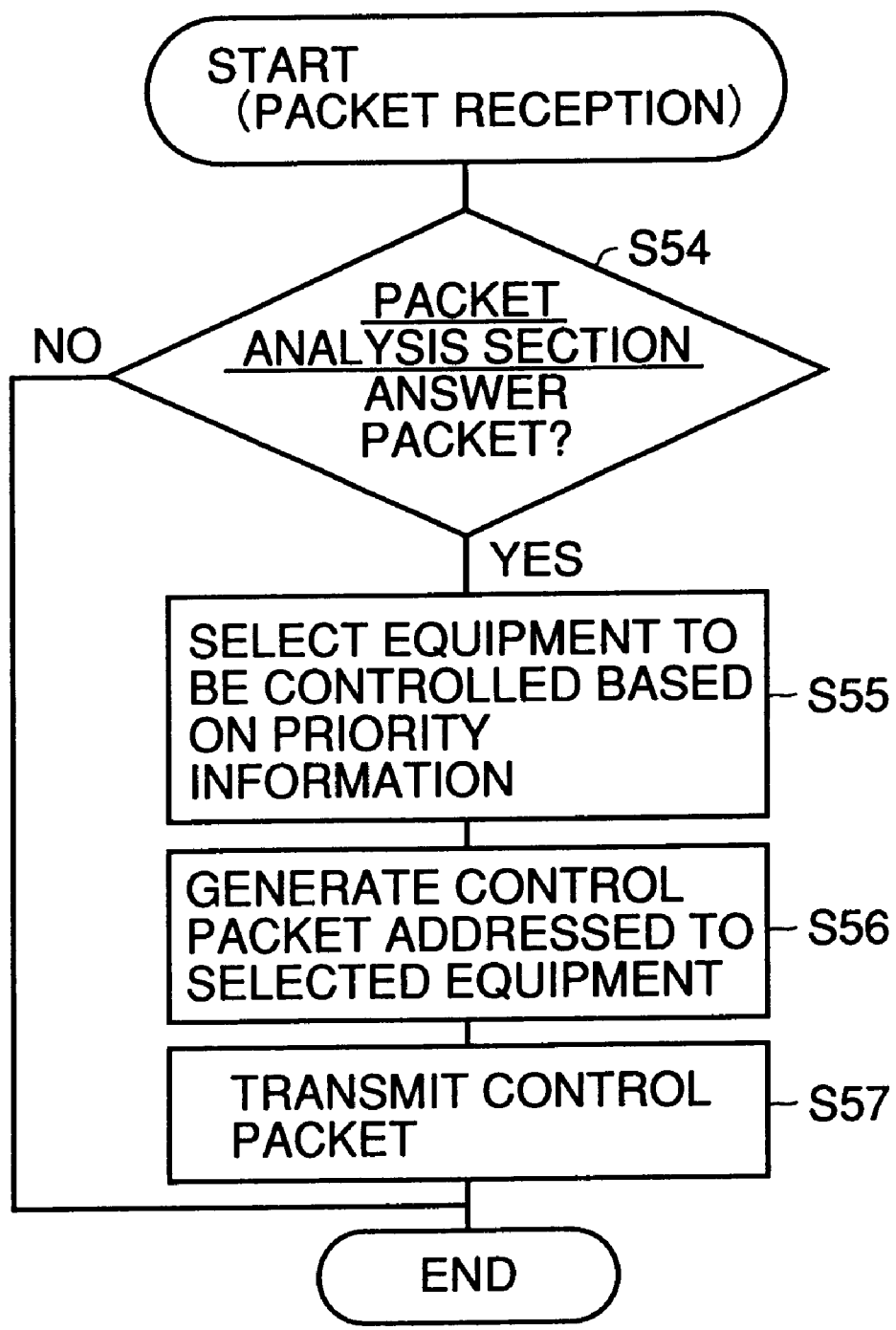
FIG. 27 is a flow chart showing a control packet transmission process in response to a packet reception in accordance with the fifth embodiment of the present invention.

FIG. 27 is a flow chart of a control packet transmission process in response to a packet reception in accordance with the fifth embodiment of the present invention.

Figure 28:
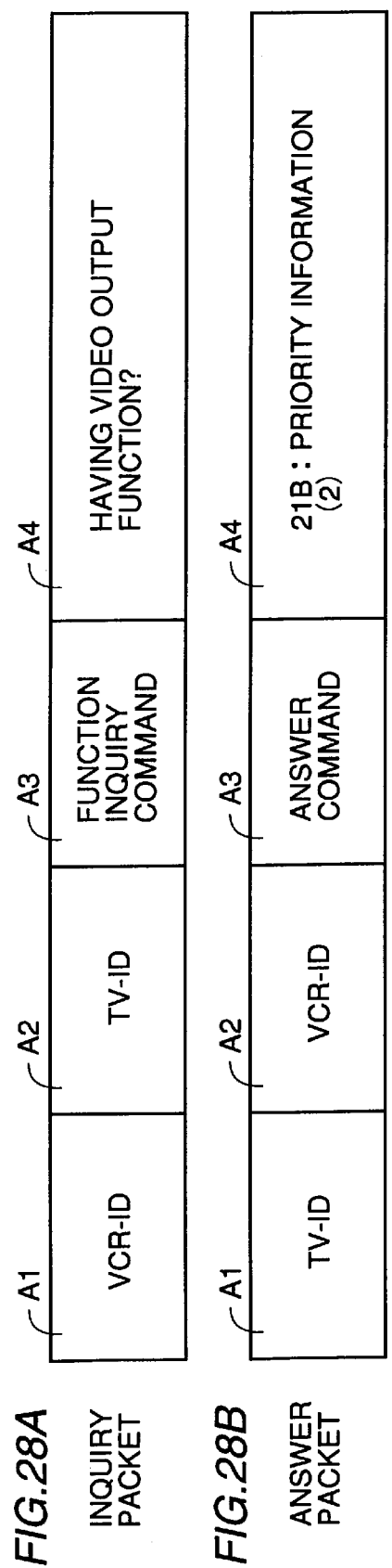
FIGS. 28A and 28B show examples of an inquiry packet and an answer packet processed in accordance with the flow charts of FIGS. 26 and 27.

FIGS. 28A and 28B show examples of an inquiry packet and an answer packet processed in accordance with the process flow chart of FIGS. 26 and 27.

Assume that VCR 36 generates and transmits an inquiry packet of FIG. 28A to each of the equipments in the system, the packet storing, as content A4, "whether the equipment has video output function".

At this time, each equipment processes the inquiry packet of 28A in accordance with the flow chart of FIG. 26. The processes in steps S45 to S51 of FIG. 26 are the same as those of steps S1 to S8 of FIG. 10. Therefore, description thereof is not repeated.

In each equipment, answer packet generating section 8c generates an answer packet of FIG. 28B in the following manner, when the received inquiry packet is addressed to it and function information indicated by content A4 in the inquiry packet is present in the function storage 10.

First, answer packet generating section 8c generates an answer packet of FIG. 28B storing self address 71 in address management section 7, transmission source address 72 and priority information 21B corresponding to the inquired function 21A in priority storage 21 as transmission source information A1, transmission destination information A2 and content A4, respectively (S52). The generated answer packet is transmitted through transmission buffer 2 (S53).

Referring to FIG. 27, in packet analysis section 4 of VCR 36, priority information 21B is extracted from each of the successively received answer packets of FIG. 28B, and the extracted information is applied to equipment selecting section 18a (S54).

In equipment selecting section 18a, based on the applied priority information 21B and the selection reference in selection reference storage 182 such as for selecting an equipment having highest priority, an equipment which is to be the object of control is selected, and the result of selection is applied to control packet generating section 13b (S55). Control packet generating section 13b transmits a control packet of FIG. 4D, for example, by reading corresponding transmission source address 72 from address management section 7 and using predetermined control command, read transmission source address 72 and so on based on the result of selection, and stores the packet in transmission buffer 2 (S56).

The control packet stored in transmission buffer 2 is transmitted through I/F 1 (S57). Therefore, in the equipment selected by priority information 21B, the control packet is received, and process in accordance with the content of the received control packet is performed.

In the present embodiment, it is assumed that each equipment has priority information 21B. However, any one of the equipments in the network may have priority information 21B of all the equipments and priority may be inquired of that equipment. Alternatively, each equipment may have priority information 21B of all the equipments.

In this manner, in accordance with the fifth embodiment, by setting priority of equipments implementing a function in advance in a suitable manner function by function, an equipment to be the object of control can be selected automatically in accordance with the priority information 21B.

Therefore, it is readily possible for the user to select a most appropriate equipment to implement a desired function as an object of control.

In the third to fifth embodiments above, a process when there are answers from a plurality of equipments to an inquiry of function information or CONTENTS data from an equipment has been described. In the third embodiment, a method is described in which inquiry is made of an user through an output section for this process and the user selects the equipment to be controlled. In the forth and fifth embodiments, methods are described in which the equipment to be controlled is selected by the equipment selection section, without inquiring of the user. In the fourth embodiment, selection is performed utilizing ability level information, while in the fifth embodiment, an equipment is selected utilizing priority information which has higher degree of freedom in setting, rather than ability level information.

(Sixth Embodiment)

Figure 29:
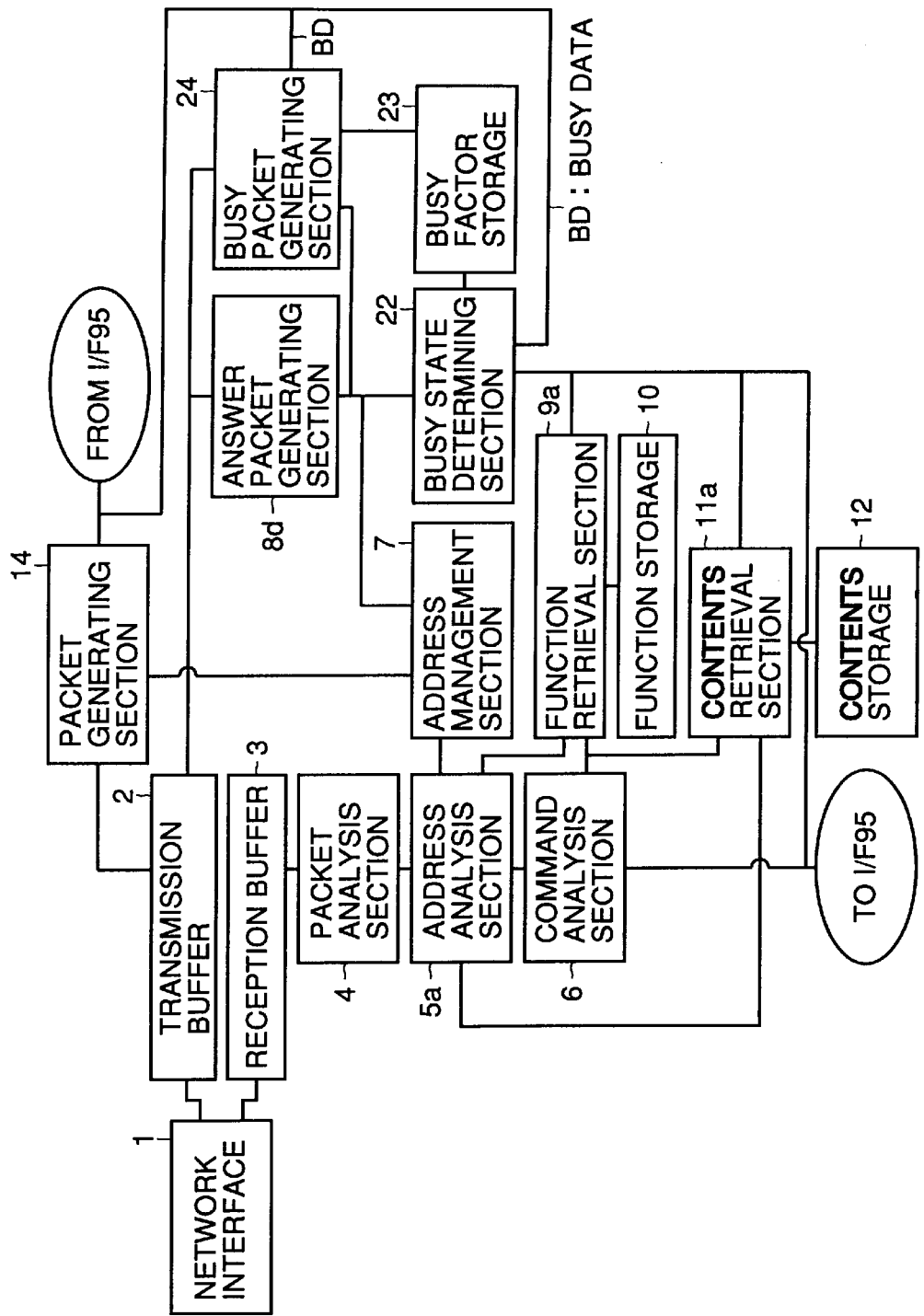
FIG. 29 shows system configuration of the communication control unit of FIG. 2 in accordance with the sixth embodiment of the present invention.

FIG. 29 shows system configuration of communication control unit 38 of FIG. 2 in accordance with the sixth embodiment of the present invention.

The system configuration of FIG. 29 is different from that of FIG. 24 in that an answer packet generating section 8d is provided in place of answer packet generating section 8c, and that a busy state determining section 22, a busy factor storage 23 and a busy packet generating section 24 are provided in place of priority storage 21, priority setting section 20, equipment selecting section 18a and control packet generating section 13b. Other portions of FIG. 29 are the same as those of FIG. 24, and therefore description thereof is not repeated.

Figure 30:
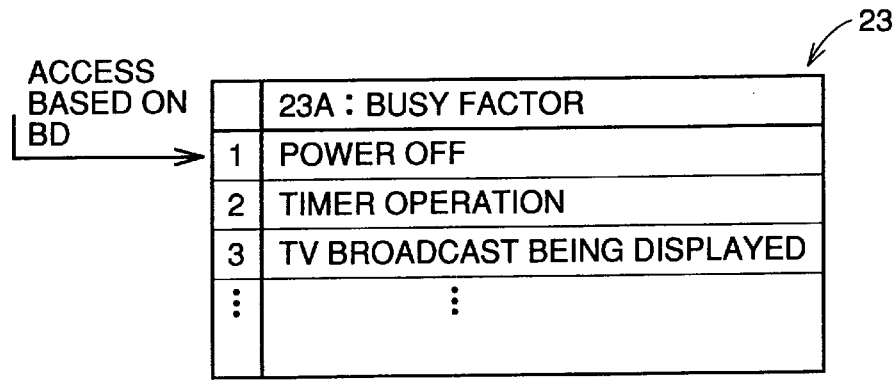
FIG. 30 shows contents of a busy factor storage shown in FIG. 29.

FIG. 30 shows contents of busy factor storage 23 of FIG. 29.

In busy state determining section 22, whether a process in accordance with a control command in the received control packet is possible or not in function implementing unit 39 is determined, based on busy data BD applied from function implementing unit 39. Busy data BD indicates uniquely a function which is being processed (implemented) in function implementing unit 39, in the form of a numerical value, for example.

Busy factor storage 23 has a plurality of busy factors 23A stored in advance as shown in FIG. 30, and it is accessed based on busy data BD. Therefore, details of the function which is being implemented indicated by busy data BD are given in detail in busy factor 23A corresponding to data BD. Here, busy state refers to a state in which a function is being implemented or carried out in function implementing unit 39 of an equipment and therefore other function cannot be implemented. Busy data BD refers to data indicating uniquely the function which is the cause of the busy state and it assumes a value "0", for example, when it is not a busy state.

Busy packet generating section 24 generates a busy packet, which is an answer packet, when it is determined by busy state determination section 22 that the corresponding function implementing unit 39 is in a busy state.

Figure 31:
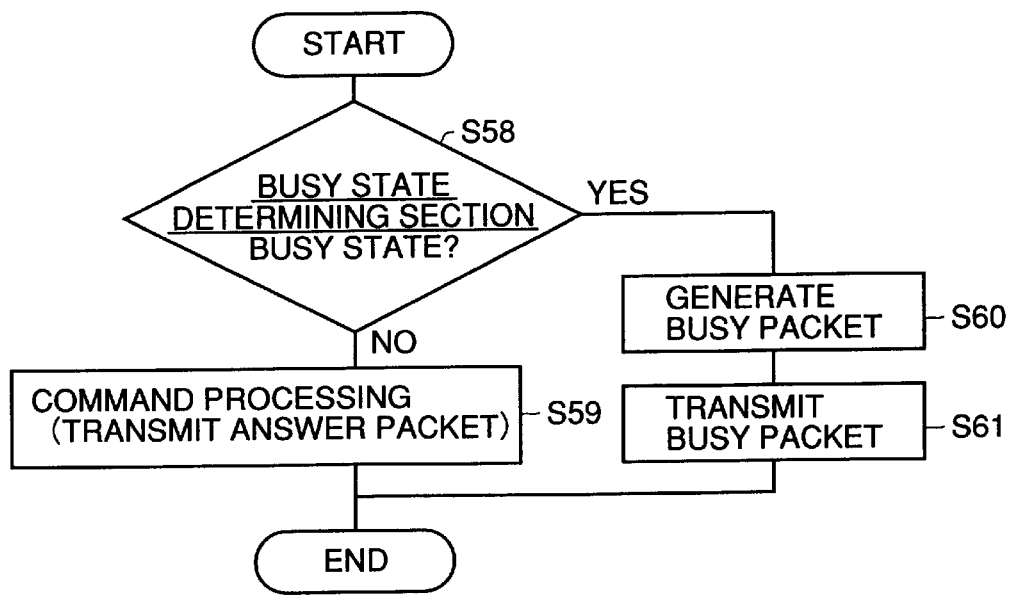
FIG. 31 is a flow chart of processing in response to a control packet reception in accordance with the sixth embodiment of the present invention.

FIG. 31 is a flow chart of processing in response to reception of a control packet in accordance with the sixth embodiment of the present invention.

Figure 32:
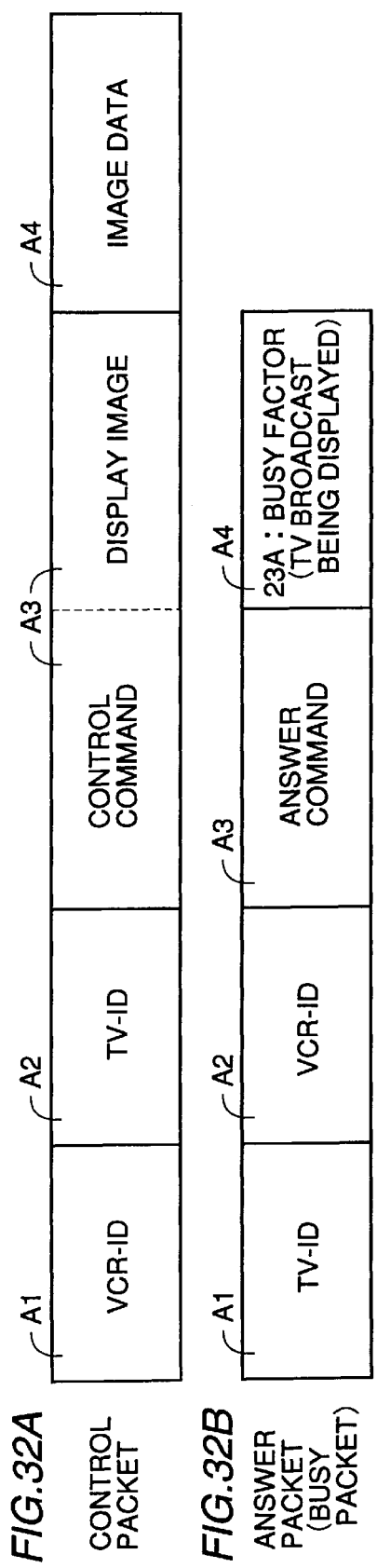
FIGS. 32A and 32B show examples of a control packet and an answer packet processed in accordance with the flow chart of FIG. 31.

FIGS. 32A and 32B show examples of a control packet and an answer packet processed in accordance with the flow chart of FIG. 31. Assume that the user operates input section 96 of VCR 36 and inputs a request for displaying image data recorded by function unit 98 on TV 31 in the living room on the first floor. In that case control packet of FIG. 32A is generated by packet generating section 14 and transmitted.

When the control packet of FIG. 32A is received, TV 31 processes command at command analysis section 6 in accordance with the processes of steps S1 to S7 of the flow chart similar to those of FIG. 10 (S8). Command analysis section 6 interprets that the command in the control packet as a command for displaying image data, and passes control to busy state determination section 22.

Referring to FIG. 31, busy state determining section 22 determines whether or not the corresponding function implementing unit 39 is in the busy state, based on applied busy data BD (S58).

If it is determined that the corresponding function implementing unit 98 is not in the busy state, command processing is requested of command analysis section 6 and, by answer packet generating section 8d, an answer packet such as shown in FIG. 13C storing the result of command execution is generated and transmitted (S59).

When it is determined that the corresponding function unit 98 is in the busy state as a TV broadcast image is being displayed, for example, busy packet generating section 24 generates a busy packet shown in FIG. 32B by using busy factor 23A obtained by accessing to busy factor storage 23 based on busy data BD, self address 71 and transmission source address 72 obtained with reference to address management section 7 (S60).

The generated busy packet is stored in transmission buffer 2 and transmitted (S61).

In the sixth embodiment, when a control packet is received in each equipment and it is determined that the equipment is in the busy state, a busy packet storing the busy factor 32A is transmitted. Therefore, it can be readily determined by the equipment on the controlling side whether the equipment to be controlled does not have the desired function or the equipment to be controlled cannot perform the desired function simply because it is busy. Further the controlling equipment receives busy factor 32A, and therefore it can recognize why the desired function cannot be executed.

(Seventh Embodiment)

Figure 33:
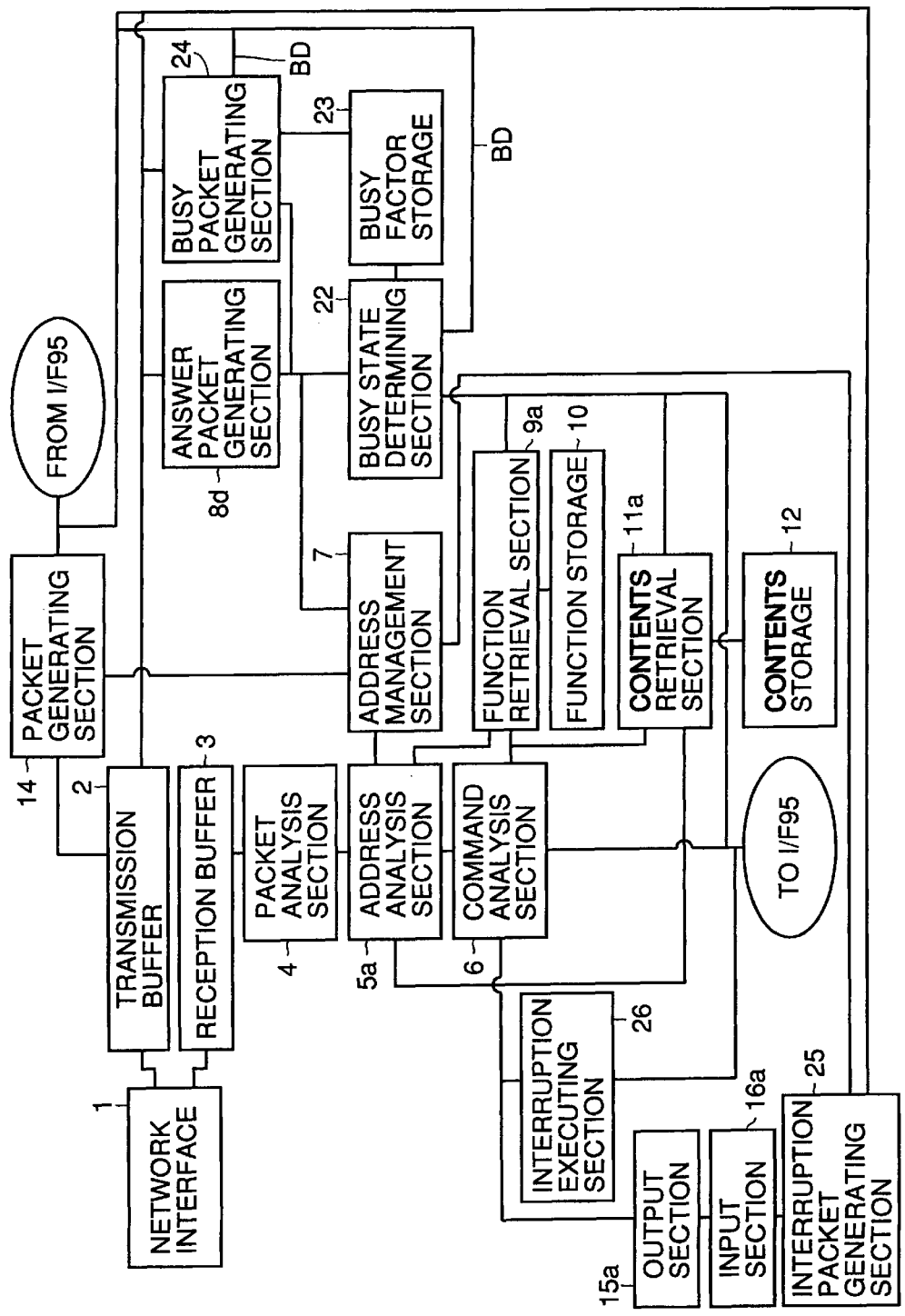
FIG. 33 shows system configuration of the communication control unit of FIG. 2 in accordance with the seventh embodiment of the present invention.

FIG. 33 shows system configuration of communication control unit 38 of FIG. 2 in accordance with the seventh embodiment of the present invention.

The system configuration of FIG. 33 is different from that of FIG. 29 in that an output section 15a for outputting various data, in the form of a display device, for example, an input section 16a for inputting various data and operated by the user, an interruption packet generating section 25 and an interruption executing section 26 are added. Other portions of FIG. 33 are the same as those of FIG. 29, and therefore description thereof is not repeated.

Interruption packet generating section 25 generates an interruption packet in response to an interruption request input through input section 16a, and stores the generated packet in transmission buffer 2.

When the interruption packet is received, interruption executing section 26 applies a command in the interruption packet to function implementing unit 39 which is in the busy state, through I/F 95. Accordingly, the command is interpreted by CPU 91 in function implementing unit 39, the process which is being carried out by function unit 98 is interrupted and stopped, and new process based on the result of interpretation is started in function implementing unit 39.

Figure 34:
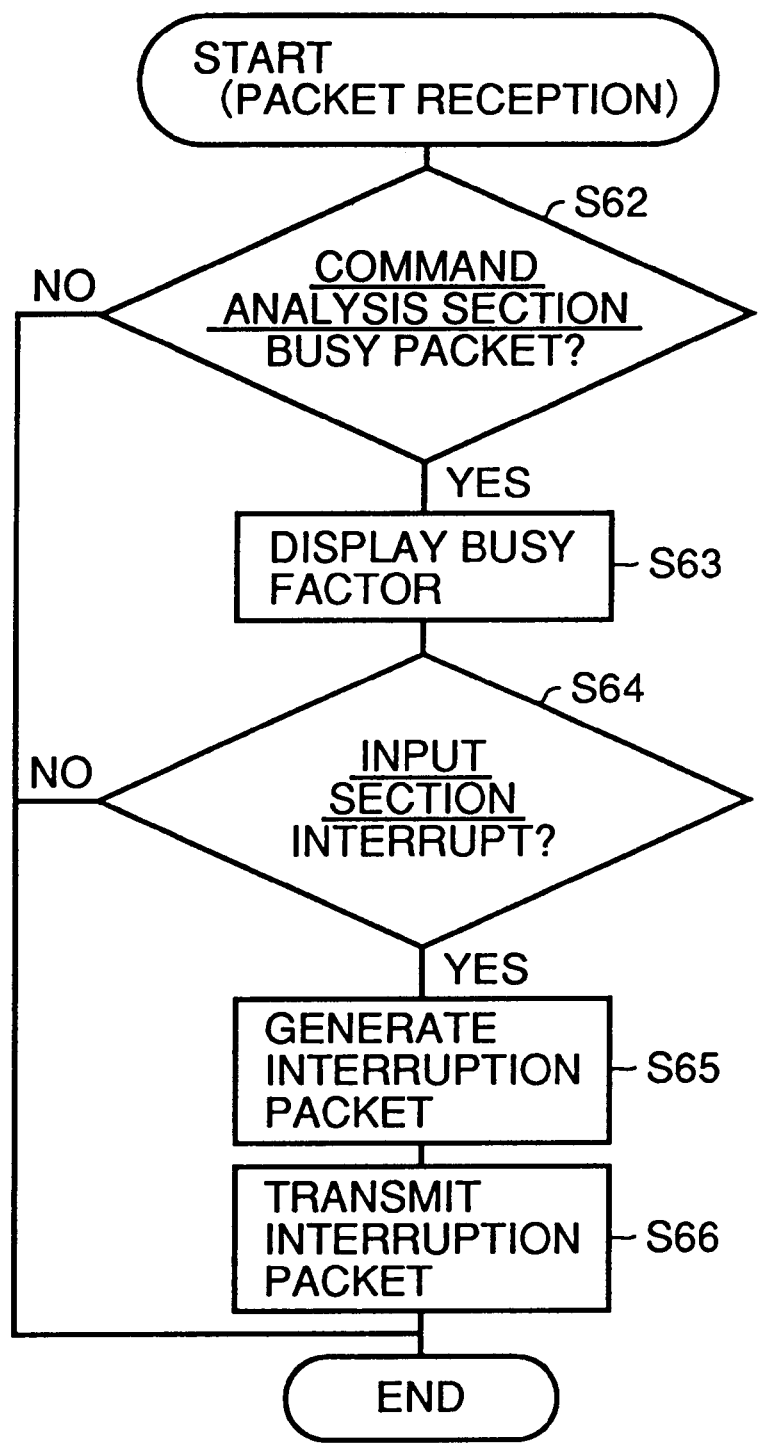
FIG. 34 is a flow chart of processing in response to a busy packet reception in accordance with the seventh embodiment of the present invention.

FIG. 34 is a flow chart of a process in response to a busy packet reception in accordance with the seventh embodiment of the present invention.

Figure 35:
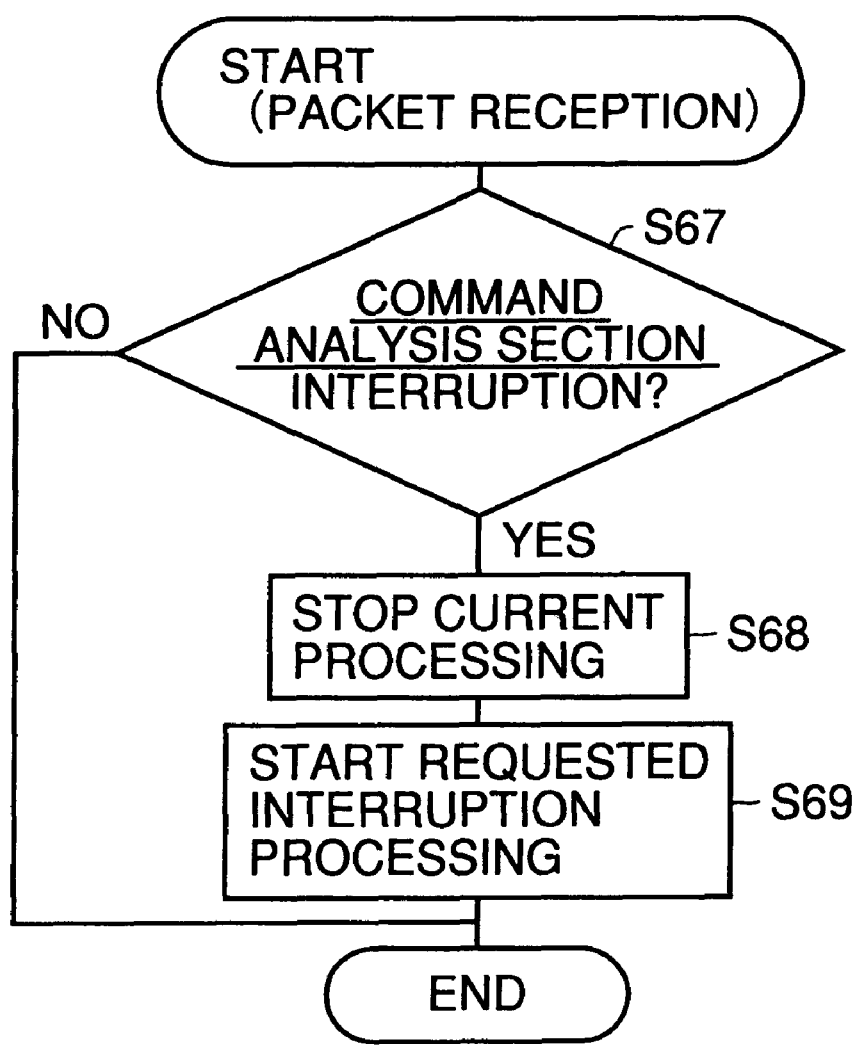
FIG. 35 is a flow chart of processing in response to reception of an interruption packet in accordance with the seventh embodiment of the present invention.

FIG. 35 is a flow chart of a process in response to an interruption packet reception in accordance with the seventh embodiment of the present invention.

Figure 36:
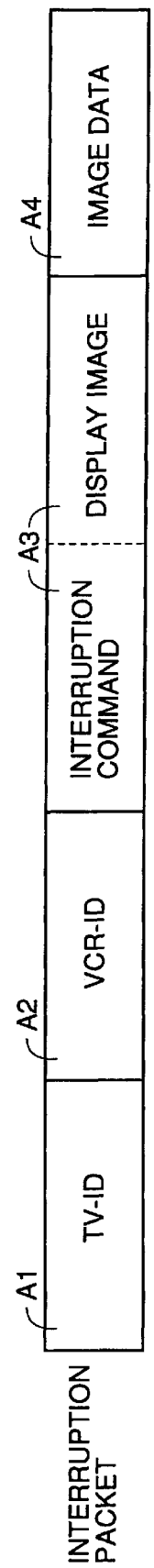
FIG. 36 shows an example of an interruption packet in accordance with the seventh embodiment of the present invention.

FIG. 36 is shows an example of an interruption packet in accordance with the seventh embodiment of the present invention.

In the interruption packet shown in FIG. 36, a command designating interruption and a command of which execution is started after interruption are stored as command A3.

Referring to FIG. 34, the busy packet shown in FIG. 32B generated and transmitted in accordance with the sixth embodiment above is received by VCR 36, subjected to processes of steps S1 to S3 and S5 of FIG. 10. Command analysis section 6 of VCR 36 interprets answer command A3 and content A4 (busy factor 23A) of the received busy packet, and as it is a busy packet, applies the busy factor 23A to output section 15a (S62).

At output section 15a, since busy factors 23A of received busy packets are displayed in the order of reception (S63), the user recognizes the busy factors 23A displayed, and when the user desires to carry out a process related to the desired function with priority than the process which is the cause of the busy state, the user operates input section 16a to input data designating interruption request, a command of a process related to the desired function to be executed by interruption, and the busy factor corresponding to the busy factors on display (S64).

In response to the interruption request from input section 16a, interruption packet generating section 25 reads from address management section 7 self address 71 and transmission source address 72 corresponding to the designated data of the input busy factor, and generates an interruption packet of FIG. 36 based on the read addresses 71 and 72 as well as the input command (S65). The generated interruption packet is stored in transmission a. buffer 2 and thereafter transmitted (S66).

The interruption packet of FIG. 36 stores image data as content A4. The image data is input from a corresponding function implementing unit 39 through I/F 95.

When the interruption packet transmitted from VCR 36 is received, in TV 31, the interruption packet is subjected to processes of steps S1 to S3 and S5 of FIG. 10 and thereafter applied to command analysis section 6.

Command analysis section 6 determines that command A3 of the interruption packet includes an interruption command (S67). Therefore, in accordance with the result of determination, interruption executing section 26 applies an instruction to function implementing unit 39 through I/F 95 to start a new process in accordance with command A3 and content A4, by interrupting the process which is being carried out in function section 98 (S68). CPU 91 interrupts the process which is being carried out or implemented in function unit 98 in response to the applied instruction, and starts new process in accordance with command A3 and content A4 (S69).

Accordingly, in TV 31, for example, the TV broadcast display is forcefully interrupted, and display of image data in the interruption packet starts.

As described above, in the seventh embodiment, it is possible to interrupt and stop a process which is being executed in an equipment which is an object of control in accordance with the user's request and to execute with priority a new process desired by the user, by transmission/reception of an interruption packet between each of the equipments.

(Eighth Embodiment)

Figure 37:
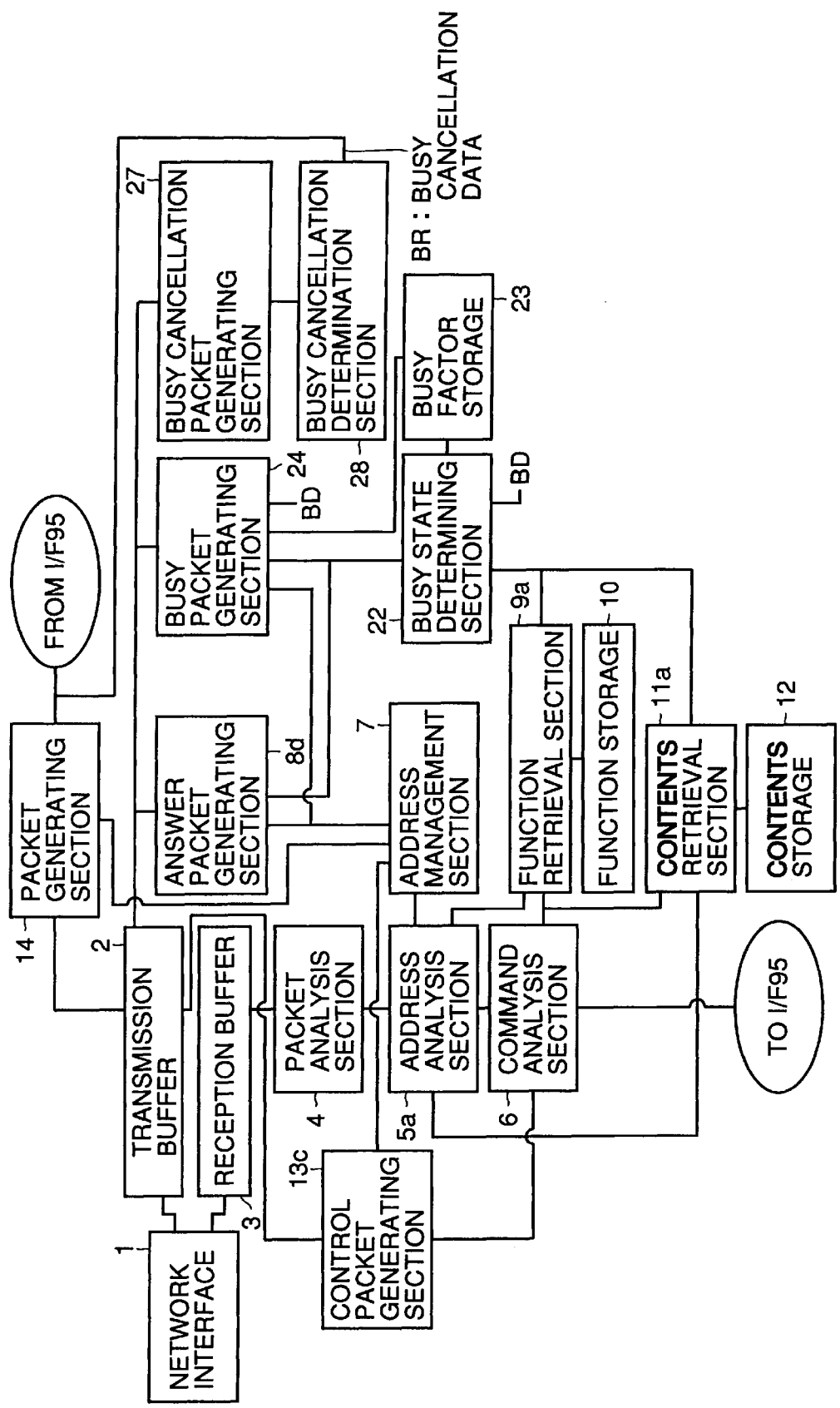
FIG. 37 shows a system configuration of the communication control unit of FIG. 2 in accordance with the eighth embodiment of the present invention.

FIG. 37 shows system configuration of communication control unit 38 of FIG. 2 in accordance with the eighth embodiment of the present invention.

The system configuration of FIG. 37 differs from that of FIG. 29 in that a control packet generating section 13c for generating a control packet, a busy cancellation packet generating section 27 and a busy cancellation determination section 28 are added. Other portions of FIG. 37 are the same as those of FIG. 27, and therefore description thereof is not repeated.

Busy cancellation determination section 28 determines whether or not the busy state is canceled, based on busy cancellation data BR applied from function implementing unit 39 through I/F 95. CPU 91 in function implementing unit 39 monitors the state of function section 98 and when it determines that the busy state is canceled, it outputs in response busy cancellation data BR to busy cancellation determination section 28 in communication control unit 38 through I/F 95.

Busy cancellation packet generating section 27 generates a busy cancellation packet in response to determination by busy cancellation determination section 28 that the busy state is canceled, and stores the generated packet in transmission buffer 2.

Figure 38:
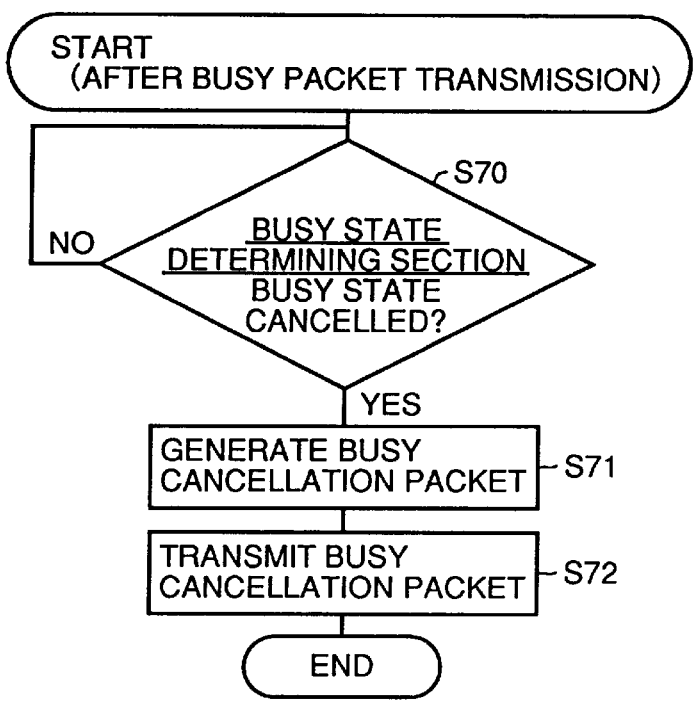
FIG. 38 shows a flow chart related to determination of busy state cancellation after transmission of a busy packet in each of the electrical appliances for home use in accordance with the eighth embodiment of the present invention.

FIG. 38 is a flow chart related to determination of busy state cancellation after transmission of a busy packet in each equipment in accordance with the eighth embodiment of the present invention.

Figure 39:
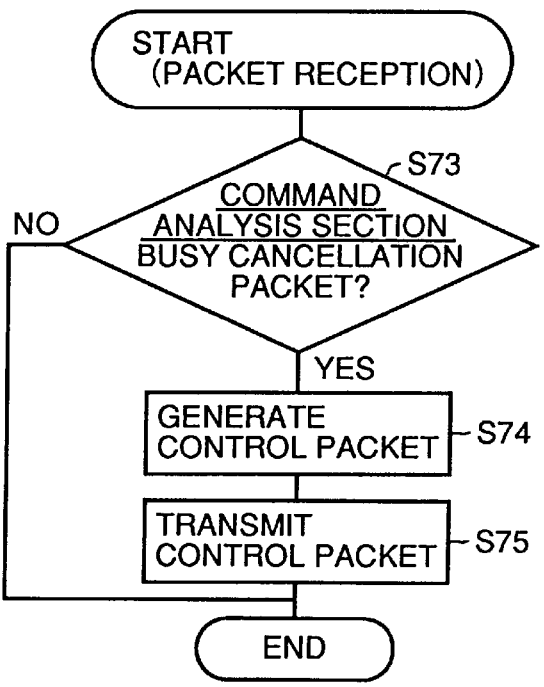
FIG. 39 shows a flow chart of processing in response to reception of a busy cancellation packet in each of the electrical appliances for home use in accordance with the eighth embodiment of the present invention.

FIG. 39 is a flow chart showing a process in response to reception of a busy cancellation packet in each equipment in accordance with the eighth embodiment of the present invention.

Figure 40:
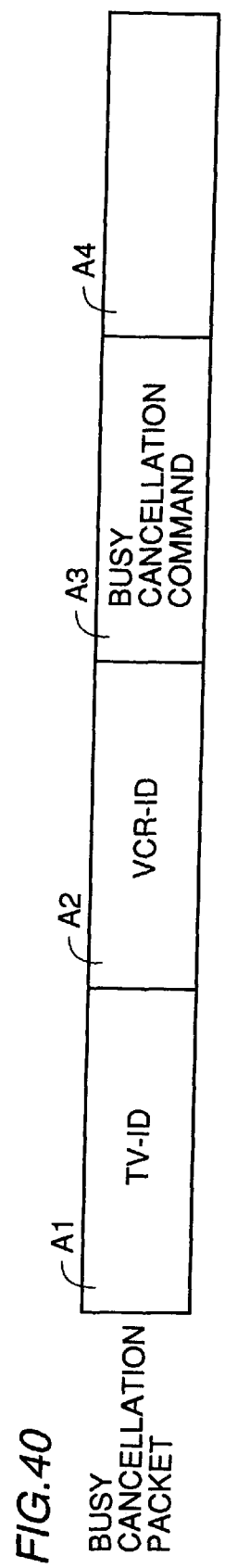
FIG. 40 shows an example of the busy cancellation packet in accordance with the eighth embodiment of the present invention.

FIG. 40 shows an example of the busy cancellation packet in accordance with the eighth embodiment of the present invention.

Referring to FIG. 38, when a busy packet is received in TV 31, for example, whether the busy state is canceled or not is determined in accordance with whether busy cancellation data BR is applied or not, at the corresponding function implementing unit 39 by busy cancellation determining section 28 (S70). If it is determined that the busy state is canceled, busy cancellation packet generating section 27 generates a busy cancellation packet shown in FIG. 40 in response (S71). The busy cancellation packet of FIG. 40 stores a busy cancellation command indicating that the busy state is canceled, as command A3.

The generated busy cancellation packet is transmitted to VCR 36 which has transmitted the busy packet, through transmission buffer 2 (S72).

Referring to FIG. 39, VCR 36 receives the busy cancellation packet transmitted from TV 31 through reception buffer 3. The received busy cancellation packet is subjected to processes of steps S1 to S3 and S5 of FIG. 10, and command analysis section 6 determines that command A3 in the received packet is a busy cancellation command (S73). In accordance with the result of determination, control packet generating section 13c generates a control packet addressed to TV 31 which stores a control command applied in advance (S74). The generated control packet is transmitted through transmission buffer 2 and received by TV 31 (S75).

In the eighth embodiment, when an equipment receiving a control instruction from a control packet from another equipment is in the busy state and thereafter the busy state is canceled, the equipment transmits to said another equipment the busy cancellation packet. Therefore, state of other equipment can readily be known without the necessity of transmission process to know whether other equipments are in the busy state or not, such as the process of transmitting the same control packet repeatedly to other equipments.

In accordance with the first to eighth embodiments above, it is possible by simply operating VCR 36, for example, to inquire function and CONTENTS data of each of the equipments in the home. Further, since function of respective equipments can be shared by all the equipments connected to transmission path 37, it is possible for refrigerator 35 which does not have the display function to give display of set temperature in the refrigerator utilizing a display screen of TV 31, for example. Further, it is possible to adjust time of heating by microwave oven 34 for melting frozen food based on the temperature in refrigerator 35.

In the first to eighth embodiments, each equipment is described as having functions of transmitting, receiving and processing and inquiry packet, transmitting, receiving and processing an answer packet, and transmitting, receiving and processing a control packet. However, the description is not limiting. More specifically, the plurality of equiments connected to transmission path 37 may include an equipment having only a function of transmitting a packet and receiving an answer packet in response, or an equipment having only a function of receiving an inquiry packet and transmitting an answer packet in response.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication method in a communication network including a plurality of equipments communicating with each other by at least one of transmitting, receiving and processing a packet, each of said plurality of equipments having a communication unit implementing communication function for said communication and a function unit for implementing at least one function other than said communication function, said communication unit having a function information storage for storing a plurality of pieces of function information related to said at least one function of said function unit, wherein said communication method includes inquiring, in said communication unit of at least one of said plurality of equipments, whether said plurality of pieces of function information are stored in said function information storage, of each of said plurality of equipments using said packet;

wherein said packet stores transmission source information for uniquely designating that one of said equipments which is a source of transmission of said packet, transmission destination information for uniquely designating that one of said equipments which is a destination of transmission of said packet, instruction information for implementing said communication function or any of said at least one function of said function unit and related information related to said instruction information, said communication method comprising a step of receiving an external request, and said method further comprising at least one of:

(a) an inquiry packet transmission step for transmitting, in response to received said external request, said packet storing an inquiry as to whether a prescribed function information is present in said plurality of pieces of function information, as said instruction information and said related information, to each of said plurality of equipments; and (b) an answer packet transmission step responsive to reception of said packet transmitted in said inquiry packet transmission step (a), for transmitting said packet storing an answer indicating whether inquired said prescribed function information is present in said function information storage, as said instruction information and said related information;

said steps (a) and (b) being performed in said communication unit;

and further comprising at least one of the following steps (c) and (d):

(c) a step of transmitting said packet storing any of said plurality of pieces of function information as said transmission destination information;

(d) (d1) a determination step receiving said packet transmitted in said step (c) of transmission for determining whether or not said transmission destination information in the received packet matches any of said plurality of pieces of function information in said function information storage; and (d2) a process execution step for executing a process in accordance with said instruction information and said related information in the received packet, in accordance with result of determination in said determination step (d1) that the information matches;

said steps (c), (d1) and (d2) being performed in said communication unit.

2. The communication method according to claim 1 wherein said plurality of pieces of function information include function specifying information for specifying each of at least one function implemented by said function unit or control object information indicating an object to be controlled by implementation of the function.

3. The communication method according to claim 2, wherein said communication unit of at least one of said plurality of equipments further includes an ability information storage storing ability information corresponding to respective ones of said function specifying information, indicating relative ability level of said plurality of equipments when a function corresponding to one same function specifying information is implemented by said plurality of equipments;

said answer packet transmission step (b) includes (b1) a step of transmitting an ability information answer packet, responsive to reception of said packet transmitted in said inquiry packet transmission step (a) for generating and transmitting said packet storing said ability information in said ability information storage corresponding to the inquired prescribed function specifying information as said related information;

said communication method further comprising:

(e) a first step of selecting an equipment for receiving said packet transmitted in said step (b1) of transmitting said ability information answer packet, and selecting a specific equipment among said plurality of equipments based on said ability information in the received packet; and (f) a first transmission step for generating and transmitting said packet storing information designating the equipment selected in said first step (e) of selecting an equipment as said transmission destination information;

said steps (e) and (f) being performed in said communication unit of at least one of said plurality of equipments.

4. The communication method according to claim 2, wherein said communication unit of any of said plurality of equipments further includes a priority storage storing priority information corresponding to respective ones of said function specifying information, indicating relative priority of said plurality of equipments when a function corresponding to one same function specifying information is implemented by said plurality of equipments;

said answer packet transmission step (b) further includes (b2) a step of transmitting a priority answer packet responsive to reception of said packet transmitted in said inquiry packet transmission step (a) for generating and transmitting said packet storing as said related information, said priority information in said priority storage corresponding to the inquired prescribed function specifying information;

said communication method further comprising:

(g) a second step of selecting an equipment for receiving said packet transmitted in said step (b2) of transmitting priority answer packet and selecting a specific equipment among said plurality of equipments based on said priority information in the received packet; and (h) a second transmission step for generating and transmitting said packet storing information designating the equipment selected in said second step (g) of selecting an equipment as said transmission destination information;

said steps (g) and (h) being performed in said communication unit of at least one of said plurality of equipments.

5. The communication method according to claim 1, wherein said communication unit of at least one of said plurality of equipments further includes a second output section;

said communication method further comprising of at least one of the following steps (j) and (k):

(j)(j1) a state determination step for receiving said packet and determining whether or not said function unit is in a busy state in which a prescribed function is being implemented and implementation of a function in accordance with said instruction information in said received packet is impossible;

(j2) a busy packet transmission step for generating and transmitting, in response to determination in said state determination step (j1) that the function unit is in a busy state, said packet as a busy packet, storing busy information indicating the busy state as an answer in said instruction information and said related information; and (k) a second output step of receiving said busy packet transmitted in said busy packet transmission step (j2) for outputting and reporting content of said received busy packet to said second output section;

said steps (j) and (k) being performed in said communication unit.

6. The communication method according to claim 5, wherein said communication unit of at least one of said plurality of equipments further includes a second input section for external data input;

said communication method further comprising at least one of:

(l) an interruption packet transmission step for generating and transmitting an interruption packet using data input, input in accordance with content reported by said second output section through said second input section; and (m) a control step responsive to reception of said interruption packet transmitted in said interruption packet transmission step (l) causing said function unit to execute processing in accordance with content of the received said interruption packet;

said steps (l) and (m) being performed in said communication unit;

wherein said interruption packet stores information designating an equipment of transmission source of said busy packet as said transmission destination information, and a command for interrupting and stopping implementation of said prescribed function causing said busy state and to start implementation of a desired function, as said instruction information.

7. The communication method according to claim 6, further comprising:

(n) a busy cancellation determination step for determining whether said busy state is canceled in said function unit; and (o) a busy cancellation packet transmission step responsive to determination in said busy cancellation determination step (n) that said busy state is canceled, for generating and transmitting said packet storing information designating said equipment of said busy packet transmission source as said transmission destination information, and a command indicating that busy state is canceled as said instruction information;

said steps (n) and (o) being performed in said communication unit of at least one of said plurality of equipments.

8. A communication method in a communication network including a plurality of equipments communicating with each other by at least one of transmitting, receiving and processing a packet, each of said plurality of equipments having a communication unit implementing communication function for said communication and a function unit for implementing at least one function other than said communication function, said communication unit having a function information storage for storing a plurality of pieces of function information related to said at least one function of said function unit, wherein said communication method includes inquiring, in said communication unit of at least one of said plurality of equipments, whether said plurality of pieces of function information are stored in said function information storage, of each of said plurality of equipments using said packet;

wherein said packet stores transmission source information for uniquely designating that one of said equipments which is a source of transmission of said packet, transmission destination information for uniquely designating that one of said equipments which is a destination of transmission of said packet, instruction information for implementing said communication function or any of said at least one function of said function unit and related information related to said instruction information, said communication method comprising a step of receiving an external request, and said method further comprising at least one of:

(a) an inquiry packet transmission step for transmitting, in response to received said external request, said packet storing an inquiry as to whether a prescribed function information is present in said plurality of pieces of function information, as said instruction information and said related information, to each of said plurality of equipments; and (b) an answer packet transmission step responsive to reception of said packet transmitted in said inquiry packet transmission step (a), for transmitting said packet storing an answer indicating whether inquired said prescribed function information is present in said function information storage, as said instruction information and said related information;

said steps (a) and (b) being performed in said communication unit;

wherein said communication unit of any of said plurality of equipments further includes identification information storage for storing identification information for facilitating recognition of respective ones of said plurality of pieces of function information, and a first output section;

said answer packet transmission step (b) further includes (b-3) identification information answer packet transmission step responsive to reception of said packet transmitted in said inquiry packet transmission step (a), for transmitting said packet storing as said related information, said identification information in said identification information storage corresponding to inquired said prescribed function information;

said communication method further comprising (p) a first output step for receiving said packet transmitted in said identification information answer packet transmission step (b-3) for outputting and reporting content of said received packet to said first output section, said step (p) being performed in said communication unit.

9. The communication method according to claim 8, wherein said communication unit of any of said plurality of equipments further includes a first input section for external data input;

said communication method further comprising (q) packet generation and transmission step for generating and transmitting said packet using data input through said first input section in accordance with content reported by said first output section, said step (q) being performed in said communication unit.

10. A communication method in a communication network including a plurality of equipments communicating with each other by at least one of transmitting, receiving and processing a packet, each of said plurality of equipments having a communication unit implementing communication function for said communication and a function unit for implementing at least one function other than said communication function, said communication unit having a function information storage for storing a plurality of pieces of function information related to said at least one function of said function unit, wherein said communication method includes inquiring, in said communication unit of at least one of said plurality of equipments, whether said plurality of pieces of function information are stored in said function information storage, of each of said plurality of equipments using said packet;

wherein said packet stores transmission source information for uniquely designating that one of said equipments which is a source of transmission of said packet, transmission destination information for uniquely designating that one of said equipments which is a destination of transmission of said packet, instruction information for implementing said communication function or any of said at least one function of said function unit and related information related to said instruction information, said communication method comprising a step of receiving an external request, and said method further comprising at least one of:

(a) an inquiry packet transmission step for transmitting, in response to received said external request, said packet storing an inquiry as to whether a prescribed function information is present in said plurality of pieces of function information, as said instruction information and said related information, to each of said plurality of equipments; and (b) an answer packet transmission step responsive to reception of said packet transmitted in said inquiry packet transmission step (a), for transmitting said packet storing an answer indicating whether inquired said prescribed function information is present in said function information storage, as said instruction information and said related information;

said steps (a) and (b) being performed in said communication unit;

wherein said communication unit of at least one of said plurality of equipments further includes a second output section;

said communication method further comprising at least one of the following steps (r) and (s):

(r)(r1) a state determination step for receiving said packet and determining whether said function unit is in a busy state in which a prescribed function is being implemented and implementation of a function in accordance with said instruction information in said received packet is not possible;

(r2) a busy packet transmission step response to determination by said state determination step that the function unit is in the busy state, for generating and transmitting as a busy packet, said packet storing busy information indicating the busy state as an answer, in said instruction information and said related information; and (s) a second output step for receiving said busy packet transmitted in said buy packet transmission step (r2) for outputting and reporting content of the received said busy packet to said second output section;

said steps (r) and (s) being performed in said communication unit.

11. The communication method according to claim 10, wherein said communication unit of at least one of said plurality of equipments further includes a second input section for external data input;

said communication method further comprising at least one of:

(t) an interruption packet transmission step for generating and transmitting an interruption packet by using data input through said second input section in accordance with the content reported by said second output section; and (u) a control step responsive to reception of said interruption packet transmitted in said interruption packet transmission step (t), causing said function unit to execute a process in accordance with the content of the received said interruption packet;

said steps (t) and (u) being performed in said communication unit;

said interruption packet stores information designating an equipment of said busy packet transmission source as said transmission destination information, and a command for interrupting and stopping implementation of said prescribed function causing said busy state and to start implementation of a desired function as said instruction information.

12. The communication method according to claim 10, further comprising (v) a busy cancellation determination step for determining whether said busy state is canceled or not in said function unit; and (w) a busy cancellation packet transmission step responsive to determination in said busy cancellation determination step that said busy state is canceled, for generating and transmitting said packet storing information designating said equipment of said busy packet transmission source as said transmission destination information and a command indicating that busy state is canceled as said instruction information;

said steps (v) and (w) being performed in said communication unit of at least one of said plurality of equipments.

13. A communication system in a communication network including a plurality of equipments communicating with each other by at least one of transmitting, receiving and processing a packet, each of said plurality of equipments having a communication unit for implementing communication function for said communication and a function unit for implementing at least one function different from said communication function, said communication unit having a function information storage for storing a plurality of pieces of function information related to said at least one function of said function unit, wherein said communication unit of at least one of said plurality of equipments inquires whether said plurality of pieces of function information are stored in said function information storage of respective ones of said plurality of equipments using said packet;

wherein said packet stores transmission source information for uniquely designating that one of said equipments which is a source of transmission of said packet, transmission destination information for uniquely designating that one of said equipments which is a transmission destination of said packet, instruction information for implementing said communication function or any of said at least one function of said function unit and related information related to said instruction information;

said communication unit includes means for receiving an external request;

and said communication unit further includes at least one of inquiry packet transmission means response to received said external request, for transmitting said packet storing an inquiry as to whether a prescribed function information is present among said plurality of pieces of function information as said instruction information and said related information, to each of said plurality of equipments and answer packet transmission means responsive to reception of said packet transmitted by said inquiry packet transmission means, for transmitting said packet storing an answer indicting whether said inquired said prescribed function information is present in said function information storage, as said instruction information and said related information;

wherein said communication unit further includes at least one of the following means (a) and (b):

(a) transmission means for transmitting said packet storing any of said plurality of pieces of function information as said transmission destination information;

(b)(b1) determining means, receiving said packet transmitted by said transmission means, for determining whether or not said transmission destination information in the received packet matches any of said plurality of pieces of function information in said function information storage, and (b2) process executing means responsive to result of determination of matching by said determining means, for executing a process in accordance with said instruction information and said related information in said received packet.

14. A computer readable recording medium for recording a communication program for executing a communication method by a computer in a communication network including a plurality of equipments communication with each other by at least one of transmitting, receiving and processing a packet, each of said plurality of equipments having a communication unit implementing communication function for said communication and a function unit implementing at least one function different from said communication function, wherein said communication unit has a function information storage for storing a plurality of pieces of function information related to said at least one function of corresponding said function unit, and said communication method including inquiring in said communication unit of at least one of said plurality of equipments, whether said plurality of pieces of function information are stored in said function information storage of respective ones of said plurality of equipments using said packet;

wherein said packet stores transmission source information for uniquely designating that one of said equipments which is a source of transmission of said packet, transmission destination information for uniquely designating that one of said equipments which is a destination of transmission of said packet, instruction information for implementing said communication function or any of said at least one function of said function unit and related information related to said instruction information, said communication method comprising a step of receiving an external request, and said method further comprising at least one of:

(a) an inquiry packet transmission step for transmitting, in response to received said external request, said packet storing an inquiry as to whether a prescribed function information is present in said plurality of pieces of function information, as said instruction information and said related information, to each of said plurality of equipments; and (b) an answer packet transmission step responsive to reception of said packet transmitted in said inquiry packet transmission step (a), for transmitting said packet storing an answer indicating whether inquired said prescribed function information is present in said function information storage, as said instruction information and said related information;

said steps (a) and (b) being performed in said communication unit;

and further comprising at least one of the following steps (c) and (d):

(c) a step of transmitting said packet storing any of said plurality of pieces of function information as said transmission destination information;

(d) (d1) a determination step receiving said packet transmitted in said step (c) of transmission for determining whether or not said transmission destination information in the received packet matches any of said plurality of pieces of function information in said function information storage; and (d2) a process execution step for executing a process in accordance with said instruction information and said related information in the received packet, in accordance with result of determination in said determination step (d1) that the information matches;

said steps (c), (d1) and (d2) being performed in said communication unit.

* * * * *